(12) United States Patent
Weitzel et al.

(10) Patent No.: US 12,310,806 B2
(45) Date of Patent: May 27, 2025

(54) DENTAL COMPONENT WITH AN INTERFACE

(71) Applicant: Nobel Biocare Services AG, Kloten (CH)

(72) Inventors: Jörg Weitzel, Rielasingen-Worblingen (DE); Ramadan Abazi, Zurich (CH); Oliver Bill, Olten (CH)

(73) Assignee: Nobel Biocare Services AG, Kloten (CH)

( * ) Notice: Subject to any disclaimer, the term of this patent is extended or adjusted under 35 U.S.C. 154(b) by 217 days.

(21) Appl. No.: 16/638,566

(22) PCT Filed: Aug. 10, 2018

(86) PCT No.: PCT/EP2018/071797
§ 371 (c)(1),
(2) Date: Feb. 12, 2020

(87) PCT Pub. No.: WO2019/034564
PCT Pub. Date: Feb. 21, 2019

(65) Prior Publication Data
US 2020/0214796 A1 Jul. 9, 2020

(30) Foreign Application Priority Data
Aug. 14, 2017 (EP) .................... 17186210

(51) Int. Cl.
*A61C 1/14* (2006.01)
*A61C 8/00* (2006.01)

(52) U.S. Cl.
CPC ............ *A61C 1/142* (2013.01); *A61C 8/0066* (2013.01); *A61C 8/0068* (2013.01); *A61C 8/0069* (2013.01); *A61C 8/0089* (2013.01)

(58) Field of Classification Search
CPC ..... A61C 1/142; A61C 8/0066; A61C 8/0068; A61C 8/0069; A61C 8/0089; A61C 8/005;
(Continued)

(56) References Cited

U.S. PATENT DOCUMENTS

| 4,854,872 A | 8/1989 | Detsch |
| 5,984,680 A | 11/1999 | Rogers |

(Continued)

FOREIGN PATENT DOCUMENTS

| DE | 20 2006 010431 U1 | 2/2007 |
| EP | 1 419 746 A2 | 5/2004 |

(Continued)

OTHER PUBLICATIONS

International Search Report dated Sep. 12, 2018; 3 pages.

*Primary Examiner* — Ralph A Lewis
*Assistant Examiner* — Mirayda A Aponte
(74) *Attorney, Agent, or Firm* — Knobbe, Martens, Olson & Bear, LLP

(57) ABSTRACT

The present invention addresses above-noted objectives by providing a dental component that includes a coronal end, an apical end, and a longitudinal axis extending between the coronal end and the apical end. The dental component also includes an interface for assembly to another dental component, the interface includes at least one indexing section for rotationally locking the dental component to the other dental component and at least one guiding section. The at least one guiding section and the at least one indexing section alternate about the longitudinal axis, wherein the guiding section includes an apically facing or coronally facing guiding surface. Further, a tangent to at least a portion of the guiding surface has a slope towards the next indexing section about the longitudinal axis.

20 Claims, 8 Drawing Sheets

(58) Field of Classification Search
CPC .... A61C 1/12; A61C 1/08; A61C 1/14; A61C 8/0048; A61C 8/00
USPC .............................. 433/173–176, 201.1, 172
See application file for complete search history.

(56) References Cited

U.S. PATENT DOCUMENTS

| | | | |
|---|---|---|---|
| 6,012,923 A * | 1/2000 | Bassett | A61C 8/005 |
| | | | 433/172 |
| 6,168,435 B1 | 1/2001 | Beaty et al. | |
| 6,250,922 B1 | 6/2001 | Bassett et al. | |
| 6,343,930 B1 | 2/2002 | Beaty et al. | |
| 6,726,480 B1 | 4/2004 | Sutter | |
| 7,104,797 B2 | 9/2006 | Rassoli | |
| 8,033,826 B2 | 10/2011 | Towse et al. | |
| 8,425,230 B2 | 4/2013 | Towse et al. | |
| 8,668,495 B2 | 3/2014 | Sanchez et al. | |
| 8,684,735 B2 | 4/2014 | van Ophuysen | |
| 8,888,486 B2 | 11/2014 | Goodman et al. | |
| 8,920,170 B2 | 12/2014 | Krivoruk | |
| 9,055,988 B2 | 6/2015 | Galgut et al. | |
| 9,357,927 B2 | 6/2016 | Thomsen | |
| 9,545,293 B2 * | 1/2017 | Sollberger | A61C 8/005 |
| 9,717,571 B2 | 8/2017 | Goodman et al. | |
| 2005/0136379 A1 * | 6/2005 | Niznick | A61C 8/0001 |
| | | | 433/173 |
| 2005/0214714 A1 * | 9/2005 | Wohrle | A61C 8/0022 |
| | | | 433/173 |
| 2009/0130629 A1 | 5/2009 | Towse et al. | |
| 2012/0251976 A1 * | 10/2012 | Mehrhof | A61C 8/0069 |
| | | | 433/173 |
| 2015/0351877 A1 | 12/2015 | Boehm et al. | |
| 2016/0199156 A1 | 7/2016 | Magnusson et al. | |
| 2016/0228218 A1 | 8/2016 | Wismann | |
| 2017/0202649 A1 | 7/2017 | Bernhard et al. | |
| 2017/0224447 A1 | 8/2017 | Richard | |
| 2017/0258558 A1 | 9/2017 | Morgan et al. | |
| 2018/0185123 A1 | 7/2018 | Kaup et al. | |
| 2018/0193115 A1 | 7/2018 | Weitzel et al. | |
| 2019/0008614 A1 | 1/2019 | Weitzel et al. | |
| 2019/0029779 A1 | 1/2019 | Vonwiller et al. | |
| 2019/0151054 A1 | 5/2019 | Weitzel et al. | |
| 2019/0247150 A1 | 8/2019 | Kaup et al. | |

FOREIGN PATENT DOCUMENTS

| | | | | |
|---|---|---|---|---|
| EP | 1 269 932 B1 | 6/2006 | | |
| EP | 2 444 024 A1 | 4/2012 | | |
| EP | 2 570 095 A1 | 3/2013 | | |
| EP | 2601906 A1 * | 6/2013 | ........... | A61C 8/0066 |
| EP | 2 436 336 B1 | 3/2016 | | |
| EP | 3 202 365 A1 | 8/2017 | | |
| JP | 2012-45402 | 3/2012 | | |
| WO | WO 2008/022635 A2 | 2/2008 | | |
| WO | WO 2010/088754 A1 | 8/2010 | | |
| WO | WO 2016/176744 A1 | 10/2016 | | |

* cited by examiner

DENTAL COMPONENT WITH AN INTERFACE

CROSS-REFERENCE TO RELATED APPLICATIONS

This application is a national stage application under 35 U.S.C. § 371 of International Application No. PCT/EP2018/071797, filed on Aug. 10, 2018, which published in English as WO 2019/034564 A1 on Feb. 21, 2019, and which claims priority benefit of EP patent application Ser. No. 17/186,210.5, filed on Aug. 14, 2017.

TECHNICAL FIELD

The present invention relates to a dental component for the restoration of at least one tooth comprising an interface for being assembled to another corresponding dental component. The present invention further relates to a dental assembly, and a method for installing the dental component with the assistance of the interface.

BACKGROUND OF THE INVENTION

Thanks to advances in the technical field of dental restorations, these dental restorations did not only become aesthetically more pleasing but have also evolved in relation to their biocompatibility and biomechanical functionality. To achieve this, today's dental restorations are in general an assembly of multiple dental components such as dental implants, abutments, bridges, spacers, superstructures, a single prosthetic tooth or multiple prosthetic teeth to allow for a patient specific adaptation of the dental restoration. For the assembly of these modular dental components, the interfaces enabling the connection between these components play a vital role in the assembly of a dental restoration and, thus, a successful treatment.

So far, the primary objective in developing interfaces of dental components has been flexibility for a patient specific adaptation. In this respect, it is an aim to provide dental professionals with modular systems that allow for selecting and arranging dental components to achieve a desired geometry for supporting a prosthetic tooth or prosthetic teeth. The connection between adjacent dental components requires interfaces for a stable connection between these components. These interfaces should preferably also provide multiple options to position or align the individual dental components to each other. As a result, these dental components include so-called indexing features that allow for an assembly of the dental components in a predetermined number of orientations in relation to each other.

However, in particular when installing dental components to each other in the mouth of a patient, where space and visibility is rather limited, these indexing features make it harder to install dental components. On the one hand, having a high number of orientations available too easily results in mating of the two components in position, while these components are brought close to each other. This relative position is likely incorrect. In order to correct this mistake, the two components have to be moved away from each other, reoriented and brought together again. On the other hand, having only few options for orientations makes it harder for the dental professional to turn one of the dental components into the right direction against the other dental component to arrive at a final position or mating relationship between the two components that has the desired radial and rotational orientation.

Yet another problem of known indexing features is the lack of feedback for the dental professional that indicates if an assembly of dental components is complete. Instead, the dental professional has to rely on testing such as trying to rotate a dental component to see, if it is in an indexing position. This testing applies additional strain to the assembly and bears the risk to prematurely put too much load on an implant since this testing is normally done without torque control.

SUMMARY OF THE INVENTION

Based on the above, the inventors realized that although there is a need for flexibility in mounting a dental prosthesis on an implant or implants, this flexibility results in a higher complexity making the installation of these dental components harder.

This resulted in the inventors having the idea to provide the interfaces of these dental components with structures that help in finding a predetermined relative position or orientation between dental components during assembly. In other words, these features should assist a dental professional in finding the mating position of these components during treatment of a patient or in a dental lab.

Another objective of the present invention was to provide dental components with features that provide feedback to a dental professional during assembly in order to register if dental components are correctly installed or not. Part of this objective was also to prevent the dental components from being damaged during early fixation, in particular when being fastened with a dental screw.

Moreover, ease of dismantling the dental assembly for a correction or revision of a dental component was also identified as a desired property as well as having preventive measures against the ingress of detrimental substances or organisms into the dental assembly.

The present invention resulting from these objectives is defined by the subject matter of the independent claims. The claims dependent thereon specify preferred embodiments.

The present invention provides a dental component that includes a coronal end, an apical end, and a longitudinal axis extending between the coronal end and the apical end. The dental component also includes an interface for assembly to another dental component, the interface comprising at least one indexing section for rotationally locking the dental component to the other dental component and at least one guiding section for guiding the other dental component about the longitudinal axis towards the next indexing section. The at least one guiding section and the at least one indexing section alternate about the longitudinal axis, wherein the guiding section can include an apically facing or coronally facing guiding surface.

The interface of the dental component as defined above provides both, guidance for a correct assembly as well as feedback that the installation of the dental component is completed. This is achieved by the alternating arrangement about the longitudinal axis of the at least one guiding section and the at least one indexing section. In other words, the guiding section and indexing section are spatially separated. In this respect, the at least one guiding section and the at least one indexing section extend so as to at least partially and preferably completely surround the longitudinal axis.

Further, there is guidance provided by the at least one guiding section, which is configured to guide a dental component with a correspondingly designed interface towards the next indexing section. More specifically, the guiding section provides guidance and extends over a predetermined angle about and along the longitudinal axis towards the next indexing section, i. e. towards an assembled position. Thus, in contrast to the prior art, the dental professional is assisted in finding the indexing position. At the indexing section, rotational locking occurs and the dental component arrives at its final position in relation to the other dental component, i. e. the dental components are axially, radially and/or rotationally aligned and the distance between the apical and dental coronal component is minimal.

Once an indexing position is reached while relatively rotating the dental component, the dental component gets rotationally locked in relation to the other dental component as the indexing sections of the two components cooperate with each other. This locking action, which prevents any further relative rotation of the dental component against the other dental component about the longitudinal axis, also gives haptic feedback to the dental professional by the movement trajectory of the dental component that the assembly of the dental components is completed. In other words, the movement trajectory of guiding differs from the movement trajectory of indexing, which results in haptic feedback for a dental professional.

The rotational locking can be achieved by a form fit or self-locking friction as will be explained in more detail below. It has the advantage that once the desired final position is established, the dental component cannot rotate out of the position, such as during fastening a dental screw or implant screw. Thus, it is easier to keep the dental component in position once rotational locking is obtained even without using a dental screw.

The guiding surface defines the geometry and dimensions of the recess or protrusion of the interface part of the interface forming the guiding section. The slope(s) of each point(s) along the guiding surface forms a surface profile as the surface extends about the longitudinal axis. This surface profile can be identified by following the inner or outer edge of the guiding surface or any line in between. The surface profile extends about the longitudinal axis and due to its slopes also along the longitudinal axis. In other words, the surface profile of the apically or coronally facing guiding surface forms a linear and/or curved line on a surface, for example a cylindrical surface, about the longitudinal axis of the dental component. The width of the guiding surface, i.e. the extension of the guiding surface in a radial direction, is preferably perpendicular to the longitudinal axis.

Since the guiding section is for guiding the dental component towards a next indexing section and, thus, the final position upon contact to another correspondingly formed dental component, the guiding section is located in front of the indexing section in the general direction of assembly, i.e. it is closer to the extremity of the dental component, the guiding surface faces. In other words, if located at the coronal end of a dental component, the guiding section is located more coronally than the indexing section and vice versa. As a result, the guiding section protrudes in relation to the indexing section in the direction of the dental component's end.

When being in the final position, the guiding section of one dental component comes to rest in the indexing section of another dental component. Consequently, the geometry and size of a guiding section generally fits into the indexing section of another correspondingly designed dental component. Nonetheless, when looking at one dental component only, the guiding section and indexing section preferably have different geometries and dimensions. For example, the guiding section(s) of a dental component can have an allover extension about the longitudinal axis that is bigger or smaller than the allover extension of the indexing section(s).

In a preferred embodiment, a tangent to at least a portion of the guiding surface has a slope towards the next indexing section in a direction about the longitudinal axis.

This structural characteristic of the guiding surface in this preferred embodiment allows the guiding surface to guide the other dental component towards the next indexing section.

The guiding surface has a slope towards the next indexing section that is preferably monotonic and faces apically or coronally. Upon contact with another component, the movement of the components towards each other will be partly transformed by the guiding surface into a rotational movement about the longitudinal axis of the dental component and will lead to a rotational alignment and/or radial alignment of the dental component relative to the other dental component. This rotational movement will guide the other correspondingly designed dental component to the next indexing section, which is formed to receive a portion of another dental component.

The guiding surface is configured with at least one slope of a tangent along the guiding surface that guides another dental component to either of the next indexing sections located at both ends of the guiding surface (which will be the same indexing section if only one guiding section and indexing section is provided). Preferably, a guiding surface has two guiding surface portions with general slopes that have opposite signs. In this case, each guiding surface has an apex, where the two guiding surface portions meet. This apex is the location of the guiding section that is closest to or at the extremity of the dental component, where the interface is located. Even more preferably, the guiding surface is configured to guide another dental component to the closest indexing section. This results in the guiding surface having an apex midway between indexing sections.

In a preferred embodiment, the interface of the dental component further comprises a mating surface for transferring forces in the direction of the longitudinal axis of the dental component, the mating surface facing in the same direction as the guiding surface and extending about the longitudinal axis, wherein at least a portion of the mating surface is arranged radially next to the guiding section and the indexing section.

By providing a mating surface that is configured to transfer forces in the direction of the longitudinal axis between dental components, it is possible to prevent any of these forces to be transferred through the indexing and guiding sections of the dental components. This has the advantage that the indexing and guiding sections do not lock in a longitudinal direction so that the dental component can be easily disassembled if necessary. In other words, this embodiment spatially allocates the functions of force transferal to different structures of the interface. Without a mating surface, the indexing and guiding sections may take over its functions and vice versa.

In this embodiment, the rotational locking function of the indexing section is preferably resulting from a form fit as described further below. The mating surface has a width in the radial direction to the longitudinal axis. Preferably, it surrounds the longitudinal axis completely.

Assisted by the forces that are transferred through the mating surface, the mating surface also provides for a seal that prevents detrimental organisms or substances from entering and accumulating inside the dental component. In order to effectively seal off the dental component, the mating surface is preferably located outwards in relation to the guiding and indexing sections and even more preferably extends to the outer circumference of the dental component, i. e. the outer edge of the dental component also forms the outer edge of the mating surface.

In another preferred embodiment, each indexing section is defined between two boundary lines, each of the boundary lines being adjacent to an end of the guiding surface, wherein the boundary lines form boundary points along the profile of the indexing section. A tangent to any one of the two boundary points has a larger absolute slope than any tangent to the profile of the guiding section. Further, the two tangents of the boundary points preferably have the same absolute slope.

The two boundary lines define the extension of each indexing section about the longitudinal axis and preferably its width in a radial direction in relation to the longitudinal axis. Accordingly, the two boundary points define the limits of each indexing section of the profile formed by the indexing section or along the allover profile formed by the indexing and boundary sections. Since the absolute slope of a tangent to any one of the two boundary points, i. e. boundary lines, is larger than the slope of a tangent at any point along the profile of the guiding section, i. e. guiding surface, the indexing section can act as a rotational lock in relation to another dental component. Moreover, the part of the indexing section that causes rotational locking of the dental component preferably has the tangent with the maximum slope along both sections.

The movement caused by the larger slope gives haptic feedback to a dental professional that the dental components have been guided to an indexing section. If the two tangents of the boundary points have the same absolute slope, the same feedback is provided for both directions of rotation.

Further, each of the two boundary lines is located directly at the end of an adjacent guiding surface. The tangent corresponds to the direction of assembly at this location, along which another dental component will move upon contact. Accordingly, if no indexing surface is present, the direction of assembly is basically parallel to the longitudinal direction of the implant so that the absolute slope of the tangent equals infinity.

In another embodiment, the tangent to each of the boundary points has an absolute angle to the longitudinal axis in a range of 0° to 10°, preferably in a range of 0° to 5°.

In this embodiment, a tangent to a boundary point of a boundary line can have a slope identical, i. e. parallel, to the longitudinal axis (0°) or can be inclined up to 10°, preferably 5°. In case of 0°, the rotational locking is achieved by a form fit since the tangent to the boundary point is perpendicular to the direction of rotation about the longitudinal axis. Thus, if the dental component is in a final position, i.e. in an end position in relation to another dental component, a relative rotation about the rotational axis is prevented.

However, a slope at the boundary points in above noted ranges of inclination will also cause rotational locking since the friction force caused by the normal force resulting from an applied torque at the boundary lines is sufficient to prevent a transformation of this torque into a movement in the longitudinal direction of the dental component.

Although above noted ranges are preferred, the locking effect may still be achieved in a range up to 30°. The skilled person will appreciate the influence of friction coefficients in this respect, i. e. the higher the angle the higher should be the friction coefficient between the components.

In a preferred embodiment, each boundary line is part of an indexing surface and preferably a linear indexing surface.

An indexing surface provides more support and a more reliable rotational locking. The locking is further improved in case of a linear indexing surface with a slope in aforementioned ranges. This result in the feedback provided to a dental professional when assembling the dental component also being improved.

In another particularly preferred embodiment, the guiding section and the indexing section form an undulating, preferably continuous, surface about the longitudinal axis of the dental component.

In this embodiment, both the indexing section and the guiding section comprise a surface. The indexing surface and the guiding surface form together an undulating surface generally extending about the longitudinal axis. Preferably, the surface is continuous, i.e. without any interruptions, so that viewed along the longitudinal axis, has a continuous extension about the longitudinal axis. This includes the indexing surface partly extending parallel to the longitudinal axis.

The profile of the undulating surface is defined by a continuous or discontinuous function. For the sake of explanation, an undulating surface defined by a continuous function has a tangent at each point along the profile of this surface, wherein each of these tangents has an absolute slope that is smaller than infinity. In contrast, if the undulating surface is defined by a discontinuous function, at least at one angle, the profile of the surface has more than one point at the same angle φ about the longitudinal axis of a cylindrical coordinate system, i. e. multiple coordinates at the same angle.

In yet another embodiment, the guiding surface of the at least one guiding section has two guiding surface portions and preferably a mounting contact surface situated between the two guiding surface portions, wherein the mounting contact surface is parallel to a plane perpendicular to the longitudinal axis.

In this embodiment, the mounting contact surface as a part of the guiding section extends the at least one guiding section surrounding the longitudinal axis and forms aforementioned apex. As a result, during assembly of the dental component, a premature rotational locking of the dental component during assembly is avoided. Instead, if the dental component is initially not being installed with the right orientation or predetermined orientation, the mounting contact surface can first get in contact with a corresponding dental component. Once in contact, the dental components can be rotated towards one of the guiding surfaces. Thus, the mounting contact surface allows the dental professional to choose and change a direction. In other words, movement along the mounting contact surface does allows to select a guiding surface. The selected guiding surface then guides the dental component towards the corresponding indexing section. Consequently, the mounting contact surface is the part of the guiding section that is at the end or closest to the extremity of the dental component.

Preferably, at least one of the dental component and the other dental component comprises a mounting contact surface to prevent above-noted premature locking of the corresponding interfaces.

In another embodiment, the two guiding surface portions each have at least one tangent, wherein the tangents of the two guiding surfaces at the same location along the longitudinal axis have the same absolute slope but different signs.

In this embodiment, the two guiding surface portions have basically the same but opposite profiles. As a result, on both sides guidance is provided in the same way to the next indexing section due to the slopes along this profile, which provides the same feedback to a dental professional for both guiding surface portions.

In another embodiment, the interface further comprises at least one radially facing support surface, the support surface preferably being located radially inwards in relation to the indexing section and guiding section and/or forms the extremity of the interface.

The support surface is cylindrical and/or conical with a circular profile as seen along the longitudinal axis. It may be located at or form the base of the interface. In this case, the guiding section and indexing section are located closer to the extremity of the dental component's interface side than the support surface. As a result, this radially facing support surface provides support for the transfer of radial forces between the dental components.

If the radially facing support surface extends along the longitudinal axis beyond the guiding section so as to form the interface's extremity. This allows the radially facing support surface to be in contact with another dental component during assembly before the guiding section. Consequently, it provides a facilitated initial axial alignment. Preferably, a chamfer is formed between the face side of the cylinder or cone at the extremity of the dental component and the support surface for further facilitating the initial assembly of the dental component. More specifically, such a chamfer helps inserting the dental component into another dental component. It also guides the rotation of the dental components about the longitudinal axis in relation to each other, similar to a bearing.

Locating the radially facing support surface radially inwards in relation to the indexing section and guiding section provides better visibility of these sections. Further, the support surface forming the extremity of the dental component and/or being inwards in particular support the structure of the guiding section.

In yet another embodiment, the mating surface is preferably frustoconical and/or undulates as a continuous periodic function along its entire extension about the longitudinal axis.

The mating surface being frustoconical results in its extension in the radial direction in relation to the longitudinal axis, i. e. width, being at an angle to the longitudinal axis other than 90°. The frustoconical surface can be circular, trioval, or facetted. Preferably, the angle to the longitudinal axis is in a range of 85° to 95° and more preferably 87° to 93°. The frustoconical mating surface is self-centering and provides an efficient sealing surface for preventing above-noted ingress of detrimental organisms or particles that may threaten the success of the dental treatment.

In addition to the above embodiment, it has been found by the inventors that the desired effects for the dental component can be best achieved with an embodiment of the dental component having two to eight sections of each type, i.e. the guiding section and the indexing section, that alternate with each other. Even more preferably, the number of sections is three to six.

As already described above, the alternating arrangement of the at least one guiding section and at least one indexing section causes the guiding section and indexing section to be spatially separate. As a result, the sum of angular extension of all indexing sections and all guiding sections amounts to 360°. In one embodiment, the ratio of angular extension between indexing section and guiding section is in a range of 0.25 to 4 and more preferably in a range of 0.5 to 2.

If the mating surface, i. e. its profile, is defined by a continuous function, this uninterrupted surface provides an effective seal. If the function defining the mating surface is periodic, it further provides a better visual indication if two dental components are in a final position in relation to each other.

Further, in another embodiment, the at least one guiding section of the dental component may be formed as a protrusion or recess with a snap-fit feature. The snap-fit feature preferably faces in the radial direction of the dental component. In a final position of two dental components, each guiding section is situated within an indexing section. Consequently, the snap-fit feature of the other dental component will be formed at an indexing section. This enables the snap-fit feature of one dental component to engage the snap-fit feature of another dental component.

The invention also provides a dental component as described above, in particular an abutment or coronal part of a multi-piece, for example two-piece, abutment, a bridge, a dental bar, a healing abutment, a spacer, a superstructure, a single prosthetic tooth or multiple prosthetic teeth, an impression coping, a personalized implant abutment, a CAD/CAM personalized implant abutment, a manually customizable abutment assembly, healing cap, a cover screw, wherein the interface is formed at the apical end of the dental component so that at least part of the interface faces apically for being assembled to another dental component, in particular a dental component such as a dental implant, an abutment or an apical part of a two-piece abutment.

Further, the dental component can be a dental implant, an abutment or a coronal or apical part of a multi-piece, for example two-piece, abutment.

The invention further provides a dental assembly for mounting a prosthesis, the dental assembly comprising a dental component with at least a part of the interface facing apically as coronal dental component and a dental component with at least a part of the interface facing coronally as apical dental component.

The interfaces of the coronal dental component and the apical dental component correspond to each other so that in an assembled state they are in a mating relationship, i. e. at a final position in relation to each other. In this final position, the coronal dental component and apical dental component are rotationally locked in relation to each other.

In an embodiment, the dental assembly further comprises a dental screw for fixating the dental assembly, the dental screw having a predetermined length, wherein the apical dental component comprises an internal thread, the internal thread being arranged along a portion of the longitudinal axis of the apical dental component so that it can only be engaged by the dental screw if the apically facing interface of the coronal dental component and the coronally facing interface of the apical dental component are arranged at a final position.

Including a dental screw and an internal thread as defined above is another feature that assists a dental professional in correctly assembling the coronal dental component and apical dental component. Assuming, the two components are not at a final position, the dental professional will realize this since it is impossible to fixate these components to each other using the dental screw with the predetermined length.

In another embodiment, the guiding section of one of the coronal dental component and apical dental component is, in a final position, at a distance to the indexing section of the other one of the coronal dental component and apical dental component.

This distance between the guiding section of one of the components and the indexing section of the other one of the components, while these components are in a final position, prevents forces in the longitudinal direction to be transferred by this part of the interfaces. Instead, such forces are transferred by another part of the interfaces, preferably the previously described mating surface. Consequently, the distance between the two sections is along the longitudinal direction of the dental components. The part of the interface comprising the guiding section and indexing section will transfer torque as well as forces that act in a transverse direction in relation to the longitudinal axis.

The present invention also provides another type of a dental component that is based on the principles of the present invention. This dental component includes a coronal end, an apical end, and a longitudinal axis extending between the coronal end and the apical end, and an interface for assembly to another dental component. The interface comprises an apically or coronally facing mating surface. The mating surface extends about the longitudinal axis and undulates as a continuous periodic function, preferably a sine function, along its entire extension. Further, the interface comprises a radially facing support surface, which is preferably located radially inwards in relation to the mating surface.

In this embodiment of the dental component, the mating surface does not only transfer forces in a longitudinal direction but also forces acting in a circumferential direction of the dental component. Thus, the mating surface also acts as indexing feature when being in a final position in relation to another dental component. Preferably, this indexing is designed to prevent rotation without the dental components being fixated with a dental screw as described above in relation to the indexing and guiding sections of the previous type of a dental component.

The radially facing support surface preferably extends and forms the extremity of the dental component's interface side as described in relation to a previous embodiment of a dental component.

In one embodiment, the mating surface is frustoconical. Such a surface has the aforementioned advantages in relation to sealing a dental assembly from the ingress of detrimental organisms or substances.

Further, the invention provides a method of installing a coronal dental component to an apical dental component comprising the steps of providing a coronal and apical dental component having interfaces as described above; moving the coronal dental component towards the apical dental component in a longitudinal direction until the interfaces get in contact; if necessary, rotating the two dental components relative to each other, wherein the interface of one of the dental components guides the interface of the other one of the dental components to an indexing position so that the two dental components are in a final position in relation to each other, wherein guiding is performed by the guiding section of the first type of dental component or the mating surface of the second type of dental component; and fixating the two dental components using a dental screw.

In one embodiment, the apical dental component is a dental implant that has been previously implanted into the upper or lower jaw bone in a mouth of a patient. In another embodiment, the apical dental component is one of the other above-noted dental components that has been previously mounted on a dental implant, preferably with an interface according to this invention.

SHORT DESCRIPTION OF THE DRAWINGS

The following figures illustrate preferred embodiments of the present invention. These embodiments are not to be construed as limiting but merely to enhance the understanding of the invention together with this description. The first digit of the reference signs refers to the number of the figure. For the remaining digits, same reference signs refer to features throughout the drawings that have the same or an equivalent function and/or structure. Consequently, a repetitive description of these components has been avoided.

FIG. 1a is an illustration of a dental assembly comprising an implant connected to a two-piece abutment as dental components according to a first embodiment;

FIG. 1b is a cross-sectional view along the longitudinal axis of the dental assembly shown in FIG. 1a;

FIG. 1c is an oblique bottom view showing the apical interface of the coronal part of the two-piece abutment shown in FIG. 1a;

FIG. 1d is an oblique side view illustrating the coronal interface of the apical part of the two-piece abutment shown in FIG. 1a;

FIG. 1e is a cross-sectional view along the longitudinal axis of the two-piece abutment shown in FIG. 1a;

FIG. 6a is an oblique side view showing a coronal interface of an apical part of a two-piece abutment according to a sixth embodiment;

FIG. 6b is a side view of the apical part shown in FIG. 6a.

DETAILED DESCRIPTION OF PREFERRED EMBODIMENTS

Figures 1A, 1B:
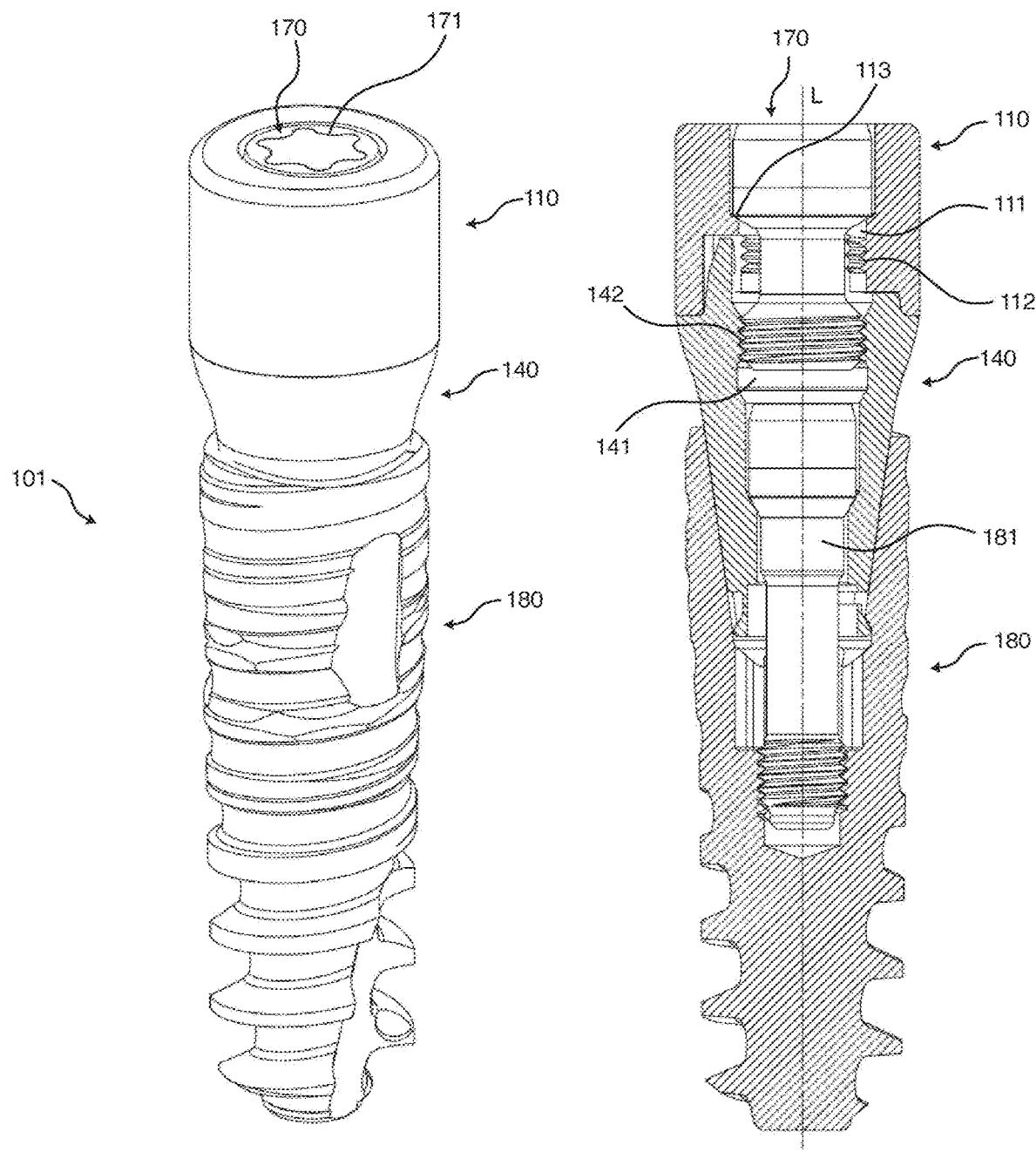

FIGS. 1a and 1b show a three-dimensional illustration of a dental assembly 101. The dental assembly comprises a dental implant 180, an implant screw 181, a two-piece abutment with a coronal dental component 110 and an apical dental component 140, and a dental screw 170. In the figures, two-piece abutments are described as an example of dental components that can make use of the interface according to the present invention. This abutment can provide the support the placement of a dental prosthesis onto a dental implant with the desired orientation and position. Nonetheless, the invention can also be applied to any of the above listed dental components.

As shown in FIG. 1b, the apical dental component 140 of the two-piece abutment is fixed to the dental implant 180 using an implant screw 181. The apical dental component 140 and the coronal dental component 110 are fixed to each other with a dental screw 170. The interface between the coronal dental component 110 and the apical dental component 140 will be described in more detail further below.

As shown in the embodiment of FIG. 1, the interface between dental implant 180 and the apical dental component 140 may differ from the interfaces between the two components 110 and 140 of the two-piece abutment. A skilled person will appreciate that the interface to the dental implant 180 may also be based on the features of an interface as the one acting between the dental components 110 and 140.

As shown in FIG. 1b, the apical dental component 140 of the two-piece abutment may have an internal thread for engagement with the thread of the dental screw 170. The placement of the internal thread 142 in the through hole 141 of the apical component 140, the placement of the screw seat 113 along the longitudinal axis L of the coronal dental component 110, and the length of the dental screw 170 are chosen so that the dental screw 170 can only be fastened if the coronal dental component 110 and the apical dental component 140 are in a final position in relation to each other.

Further, the coronal component 110 may also have an internal thread 112 that is arranged in the through hole 111 of the coronal dental component. This thread 112 is able to hold the dental screw 170 before assembly. This arrangement facilitates assembly in the mouth of a patient since the dental screw 170 does not have to be inserted separately. This avoids losing the screw during assembly. In particular during assembly in the mouth of a patient (in contrast to an assembly in a dental lab), the risk of the screw being swallowed or inhaled by the patient can basically be averted.

Figure 1C:
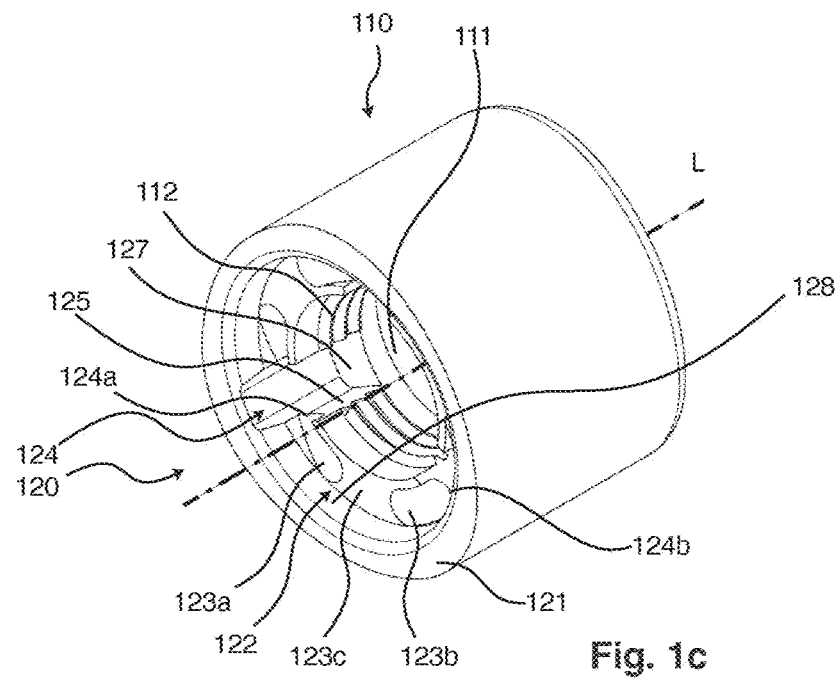
Figure 1D:
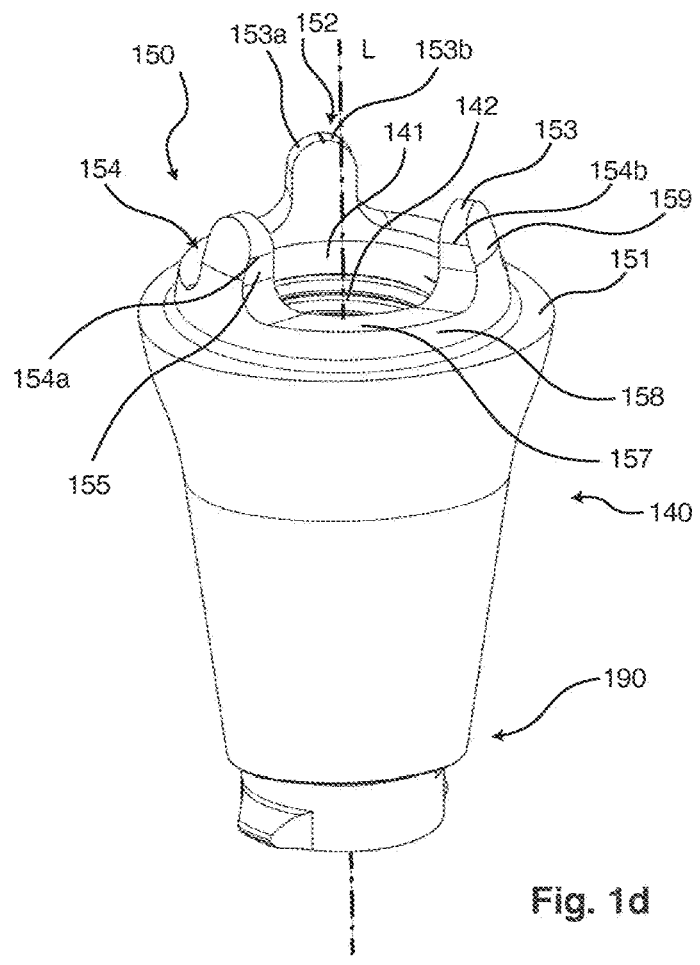
Figure 1E:
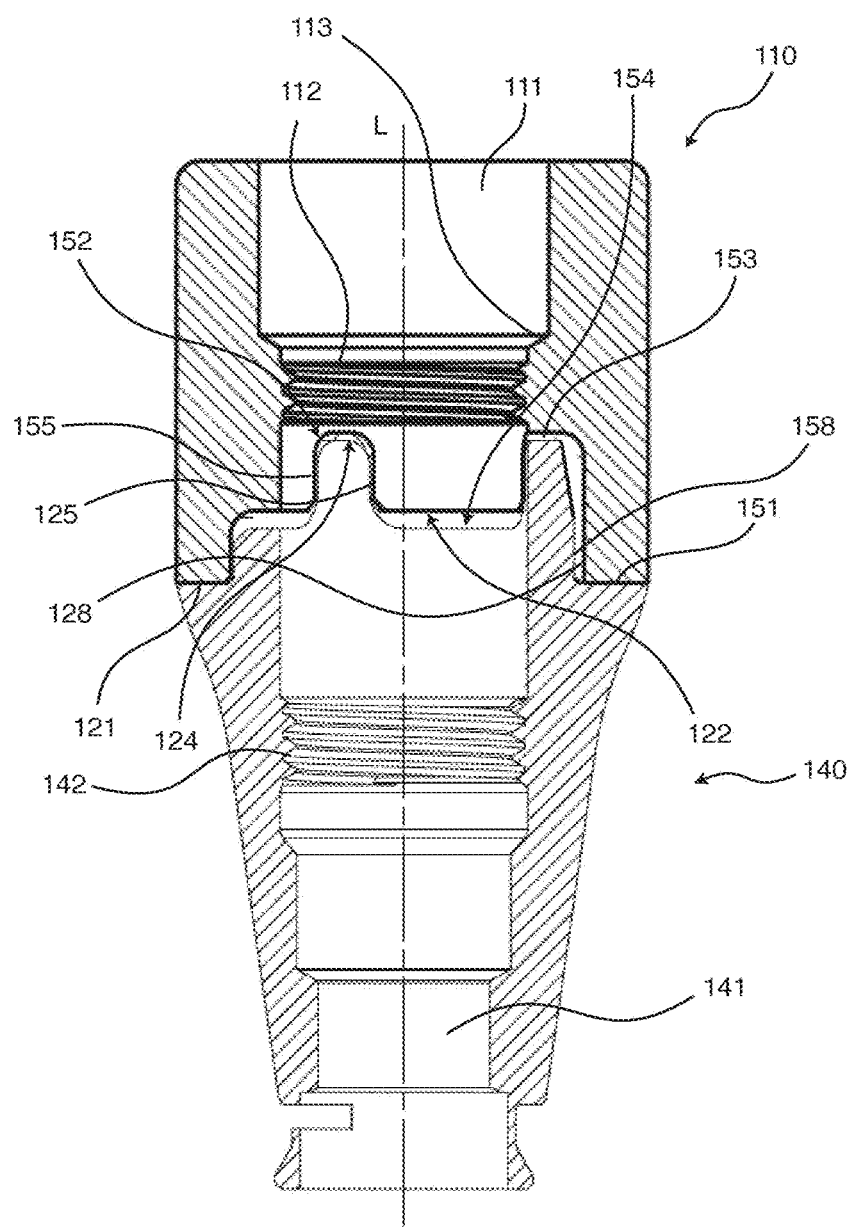

Turning to FIG. 1c and FIG. 1d, these figures show the coronal component 110 and the apical component 140, respectively, in more detail. Both dental components 110 and 140 have a longitudinal axis L. In an assembled state, the longitudinal axes of the coronal dental component 110 and the apical dental component 140 form the longitudinal axis L shown in FIGS. 1a and FIG. 1b. In other words, the longitudinal axes get aligned during assembly.

The coronal dental component 110 of FIG. 1c is shown in a three-dimensional view from below. At its apical end, the coronal dental component 110 includes an apical interface 120. In the exemplary embodiments, the apical interface 120 comprises three guiding sections 122 that alternate with three indexing sections 124 so that they completely surround the longitudinal axis L of the coronal dental component 110. As a result, there are three different relative orientations available between the dental components 110 and 140.

The embodiments illustrated in any of the figures of this application show the same number of guiding sections for the apical and coronal dental components. However, it is also possible to configure an embodiment so that the number of guiding sections and/or indexing sections of one of these dental components is lower than the number of guiding sections and/or indexing sections of the other component. For example, the coronal dental component 110 shown in FIG. 1c may have only one or two guiding sections 123c as shown and one or two indexing sections 124, respectively, that extend along the remaining angular extend about the longitudinal axis L. Such an apical interface 120 still corresponds to the coronal interface 150 of the apical dental component 140 shown in FIG. 1d. As a result, the two components 110 and 140 can be mounted to each other to take a final position, in which they are radially and rotationally aligned. Alternatively, the apical dental component 140 shown in FIG. 1d may only have one or two guiding sections 152 and/or only one or two indexing sections 154, respectively. If there is only one indexing section, the accommodation surface 157 will simply extend further about the longitudinal axis L.

The interface 120 includes a radially facing support surface 128 that faces radially inwards and basically extends to the extremity of the coronal dental component 110 on the side of the apical interface 120. The radially facing support surface 128 provides support for a rotation about the longitudinal axis during assembly and guidance to a next indexing section 124. The interface 120 also comprises an apically facing mating surface 121. Further, the coronal dental component 110 includes an internal thread 112 that is located within a through hole 111. As described above, the internal thread 112 can hold a dental screw prior assembly.

Each guiding section 122 comprises and preferably consists of a guiding surface 123. Like the mating surface 121, the guiding surface 123 also faces in an apical direction. During assembly, the guiding surface 123 guides the apical dental component 140 to a next indexing section 124 in a rotational direction about the longitudinal axis L. As a result of its function, the guiding surface 123 consists of surface portions that face apically over their entire extension. The guiding surface 123 may be defined by two guiding surface portions 123a and 123b and a mounting contact surface 123c. The function of each of these surfaces will be described in relation to the assembly of the coronal dental component 110 to the apical dental component 140.

Preferably, the guiding sections 122 are symmetrical to a plane crossing and extending along the longitudinal axis L. This results in the guiding surface portions 123a and 123b having the same surface profiles in a cylindrical coordinate system with the longitudinal axis L being the longitudinal axis h of this system (cf. FIGS. 3b and 3c). In the cylindrical coordinate system, each of the guiding surface portions 123a and 123b has at least one slope, i.e. they have a linear and/or curved profile, wherein the corresponding slopes of the guiding surface portions 123a and 123b have opposite signs.

The indexing section 124 is preferably for rotationally locking the coronal dental component 110. Since guiding sections 122 and indexing sections 124 alternate about the longitudinal axis L, each indexing section 124 is placed in between two guiding sections 122 and vice versa if there are at least two guiding sections 122 and two indexing sections 124 provided. Each indexing section 124 begins and ends with boundary lines 124a and 124b, respectively. The boundary lines 124a and 124b define boundary points 124a' and 124b' that mark the beginning and end of the profile of each indexing section 124. By definition, these boundary points 124a' and 124b' of the surface profile or boundary lines 124a and 124b along the width belong to the indexing section 124.

In the exemplary embodiment of a coronal dental component 110 shown in FIG. 1c, the indexing section 124 includes two linear indexing surfaces 125. The indexing surfaces are limited by the boundary lines 124a, 124b, respectively, and extend substantially parallel to the longitudinal axis L. Consequently, the slope of the profile of the linear indexing surface 125 as well as the slope of a tangent at the profile of the boundary lines 124a and 124b, i. e. the boundary points 124a' and 124b', is infinite in above-mentioned cylindrical coordinate system. As a result, the indexing section 124 is configured for rotationally locking in relation to another dental component such as the apical dental component 140 by means of a form fit. Due to this form fit a rotation about the longitudinal axis L in a plane perpendicular to the longitudinal axis will be transferred to the other dental component but does not result in the two components being separated in a longitudinal direction. The latter can happen if the indexing surfaces 125 sufficiently taper along the longitudinal axis L towards the coronal end of the coronal dental component 110. The tapering would then cause that above-noted torque is partly transformed into a force acting in the direction of the longitudinal axis and partly into a force acting in a circumferential direction. In order to result in a movement separating the two dental components, the longitudinal force, i. e. the taper, has to be large enough to overcome frictional forces that act due to the circumferential force.

As illustrated in FIG. 1, for each dental component 110 or 140, the geometry and dimensions of the guiding sections differs from the geometry and dimensions of the indexing sections, in particular their extension about the longitudinal axis L. However, due to the corresponding nature of the interface 120 of the coronal dental component 110 and the interface 150 of the apical dental component 140, parts of the sections have corresponding geometries and dimensions in order to allow for a final position between these components.

FIG. 1*d* illustrates the apical dental component 140. The apical dental component 140 comprises a coronal interface 150 that corresponds to the apical interface 120 of the coronal dental component 110. In other words, the coronal interface 150 and the apical interface 120 are designed so that they can be engaged in a final position in relation to each other.

The apical component 140 comprises a predetermined number of guiding sections 152 and indexing sections 154 that corresponds to the number of guiding sections 122 and indexing sections 124 of the coronal dental component 110. In the embodiment shown in FIG. 1, the dental components 110 and 140 are equipped with three sections of each type. As described previously, other numbers of sections can be incorporated into the structure of the interface that also facilitate assembly of the two dental components 110 and 140.

Each guiding section 152 of the apical dental component 140 has a guiding surface 153. The guiding surface 153 is in turn subdivided into two guiding surface portions 153*a* and 153*b*. In contrast to the guiding sections 122 of the coronal dental component 110, the guiding sections 152 of the apical dental component do not have a mounting contact surface. Nonetheless any or both may include one.

Each end of the guiding surfaces 154 is adjacent to boundary lines 154 *a* and 154 *b*. The boundary lines 154 *a* and 154 *b* define the outer limits of the guiding sections 154. At the opposite sides of the guiding lines 154 *a* and 154 *b* can be indexing surfaces 155. In the first embodiment, the slope of the indexing surfaces is basically parallel to the longitudinal axis L, i.e. infinite. Nonetheless, other slopes may be applied such as the ones defined above.

Between the two indexing surfaces 155 of each indexing section 154 may extend an accommodation surface 157. In the exemplary embodiment, the accommodation surfaces 157, indexing surfaces 155, and guiding surfaces 153 form an undulating surface that undulates along (or in the direction of) the longitudinal axis L while surrounding this axis, i. e. the amplitudes of the undulating surface extend in a longitudinal direction. This undulating surface is substantially coronally facing and has substantially an annular shape as seen from a perspective along the longitudinal axis L.

Within a through hole 141, the apical dental component 140 includes an internal thread 142. The thread 142 is for fixating the coronal dental component 110 to the apical dental component 140 using a dental screw 170 (cf. FIGS. 1*a* and 1*b*).

The apical dental component 140 may further comprise a radially facing support surface 158. For being arranged at a final position with the radially facing support surface 128 of the coronal dental component 110, the radially facing support surface faces radially outwards. In contrast to the radially facing support surface 128 of the coronal dental component 110, the radially facing support surface 158 is provided at the base of the corresponding coronal interface 150. In other words, it is located before (or apically to) the indexing sections 154 and the guiding sections 152, the latter forming the extremity of the apical dental component 140.

The radially facing support surfaces 128, 158 may both be tapered or cylindrical. When being engaged during assembly, the radially facing support surfaces 128, 158 are in contact or support each other in a radial direction and allow for the transfer for forces in this direction. For this function, the radially facing support surfaces 128, 158 preferably comprise at least a portion that completely surrounds the longitudinal axis L.

Further, the interface 150 of the apical dental component 140 may include a coronally facing mating surface 151. The coronally facing mating surface 151 is preferably located at the outer periphery of the coronal interface 150 and has a ring shape. Once assembled, the coronally facing mating surface 151 is in contact with the apically facing mating surface 121 of the coronal dental component 110. Due to this contact, the mating surfaces 121 and 151 preferably seal the inner portion of the assembled dental components 110 and 140 against ingress of detrimental organisms or other substances. In use of the dental assembly 101, the mating surfaces 121 and 151 transfer forces acting in a longitudinal direction between the two dental components 110 and 140.

The surfaces of the guiding sections 152 and indexing sections 154 define the coronal shape and width of an annular protrusion at the interface 150. Correspondingly, the guiding sections 122 and indexing sections 124 of the coronal dental component 110 define the shape and form of an annular recess. As a result, the mating surfaces 121 and 151 are in contact if the dental components 110 and 140 are at a final position. It will be clear to the skilled person that it is also possible to form this part of the interface as protrusions at the apical interface 120 of the coronal dental component 110 and as recesses at the coronal interface 150 of the apical component 140. Other configurations are also possible and envisaged (cf. FIG. 5).

The structure of the coronal interface 150 defined by the guiding surface 153 and a part of the indexing surface 155 forms a finger-like protrusion 159 that tapers coronally in a radial direction. This taper is adjacent to the cylindrical radially facing support surface 158 and has an inclination in relation to this surface. This taper of the protrusion 159 facilitates insertion of the protruding part of the coronal interface 150 into the recessed part of the apical interface 120.

An assembly of a coronal dental component 110 to an apical dental component 140 can be performed as follows.

After insertion of a dental implant 180 and generally a healing period, the apical dental component 140 and the coronal dental component 110 can be assembled to the dental implant 180 so as to form the dental assembly 101 shown in FIGS. 1a and 1b. Alternatively, assembly can take place in a dental lab, for example for designing and/or fitting the prosthetic tooth. In the case of assembly in a lab, the dental implant 180 may be replaced by a dental implant analogue (not shown).

Assembly starts with mounting the apical dental component 140 to the dental implant 180 by means of the apical interface 190 and an implant screw 181. When beginning the assembly of the coronal dental component 110 to the apical dental component 140, a dental screw 170 is preferably already in threaded engagement with the inner thread 112 of the coronal dental component 110. As mentioned above, the coronal dental component 110 and the apical dental component 140 are in this example parts of a two-piece abutment. The skilled person will appreciate that any other combination of the above-noted dental components applying the features of the invention may be used instead.

For installing the coronal dental component 110 against the apical dental component 140, the longitudinal axes L of both components are substantially brought into alignment. This step is supported by the tapering portions of the fingerlike protrusions 159 if present. When the coronal interface 150 of the apical dental component 140 and the apical interface 120 of the coronal dental component 110 approach each other, the following steps in the assembly depend on the rotational orientation of the dental components 110 and 140 in relation to each other.

In a first scenario, if the coronal dental component 110 is already correctly aligned to the apical dental component 140, the fingerlike protrusions 159 of the coronal interface 150 will readily enter the indexing sections 124 of the apical interface 120. As a result, the indexing surfaces 125 of the coronal dental component 110 will face the indexing surfaces 155 of the apical dental component 140 in both rotational directions. This facing relationship will establish the rotational lock between the two dental components 110 and 140. In the illustrated example, the rotational lock between the two dental components 110 and 140 is caused by a form fit due to the orientation of the indexing surfaces 125 and 155 parallel to the longitudinal axis L. As mentioned above, the indexing surfaces 125 and 155 may also be inclined in the above noted ranges so that a rotational lock is established by self-looking friction.

As illustrated in the cross-sectional view of FIG. 1d, the coronal dental component 110 and the apical dental component 140 are brought together until the apically facing mating surface 121 of the coronal dental component contacts the coronally facing mating surface 151 of the apical dental component 140.

In the final position, i. e. a mating relationship, of the coronal dental component 110 and the apical dental component 140 relative to each other, the most apical part of the indexing sections 154 is preferably at a distance to the most apical part of the guiding sections 122. In a corresponding manner, the most coronal part of the indexing sections 124 is preferably at a distance to the most coronal part of the guiding sections 152. In the illustrated embodiment, the coronal portion of the guiding surfaces 153 of the apical dental component is at a distance to the coronal portion of the accommodation surfaces 127 of the coronal dental component 110. Likewise, the apical portion of the guiding surfaces 123 of the coronal dental component 110 is at a distance to the apical portion of the accommodation surfaces 157 of the apical dental component 140. This arrangement is preferred in order to ensure an annular contact between the mating surfaces 121 and 151 for achieving an effective seal for sealing off the inside of the dental components 110, 140 on the level of the interfaces 120 and 150.

The radially facing support surface 128 of the apical interface 120 and/or the radially support surface 158 of the coronal interface 150 may be configured to assist in sealing off the inner portion of the two-piece abutment as described in more detail further below, in particular when the two dental components 110 and 140 are fixated using the dental screw 170. In addition or alternatively, an O-ring, preferably in combination with at least one groove in at least one of the mating surfaces 121 and 151 and/or support surfaces 128 and 158 can be used to form a seal.

In another scenario, in which the coronal dental component 110 is not correctly aligned with the apical dental component 140, the guiding sections 122 of the coronal dental component 110 will first get into contact with the guiding sections 152 of the apical dental component 140. More specifically, at least one of the guiding surface portions 153a and 153b of the guiding sections 152 will get in contact with one of the guiding surface portions 123a and 123b or the mounting contact surface 123c of the guiding sections 122.

In case first contact is established between the guiding surfaces 153 and the mounting contact surfaces 123c, a dental professional can then rotate the coronal dental component 110 and the apical dental component 140 in one of the rotational directions about the longitudinal axis L relative to each other, i.e. clockwise or counterclockwise. As described above, this rotation can be supported by the radially facing support surface 128.

This rotation results in one of the guiding surface portions 153a and 153b of the coronal interface 150 getting into contact with one of the guiding surface portions 123a and 123b of the apical interface 120. Since both guiding surface portions 123a and 123b have a surface profile that is directing towards the next indexing section, the guiding sections 152 of the apical dental component 140 will approach the indexing sections 124 of the coronal dental component 110 by moving in a rotational and a longitudinal direction. In other words, the configuration and cooperation of the guiding sections provoke a longitudinal motion of at least one of dental component relative to the other when a dental component is rotated relative to the other about the longitudinal axis. The same applies to the interaction between the guiding sections 122 of the coronal dental component 110 and the indexing sections 154 of the apical dental component 140. Consequently, a dental professional mounting the coronal dental component 110 onto the apical dental component 140 will be guided towards engaging these components in a final position.

Doing so, the dental professional will receive haptic feedback of reaching the predetermined relative position between the coronal dental component 110 and the apical dental component 140. This feedback is caused by the discontinuous change in slope between the guiding surface portions 123a, 123b and the indexing surface 125 at the boundary lines 124a, 124b of the coronal dental component 110.

Once a final position is reached, a dental professional can fasten the dental screw 17 so that it disengages from the inner thread 112 of the coronal dental component 110 (if present) and engages the inner thread 142 located in the through hole 141 of the apical dental component 140. This results in the dental components 110 and 140 being assembled.

However, if the two dental components 110 and 140 are not at a final position, they will not engage due to the location of the thread 112 and the predetermined length of the dental screw 170 in order to prevent fixation in an undesired relative position since the length of the dental screw 170 is too short. The skilled person will appreciate that the inner thread 142 may also be located within a blind hole of the apical dental component 140 if the apical interface 190 of the apical dental component 140 allows an attachment to a dental implant 180 without an implant screw 181.

It should be noted that the inner thread 112 of the coronal dental component 110 may also be used for helping in dismantling the two-piece abutment, if necessary. As a first step, the dental screw 170 is loosened and removed using a tool that engages the engagement section 171 of the dental screw 170. In the next step, a dismantling screw (not shown) is inserted and brought into a threaded engagement with the inner thread 112 until the tip of the screw that has a smaller diameter than the inner diameter of the inner threads 112 and 142 contacts either the head of the implant screw 181 or the bottom of above noted blind hole. Screwing further will then pull the coronal dental component 110 away from the apical dental component 140.

Figure 2A:
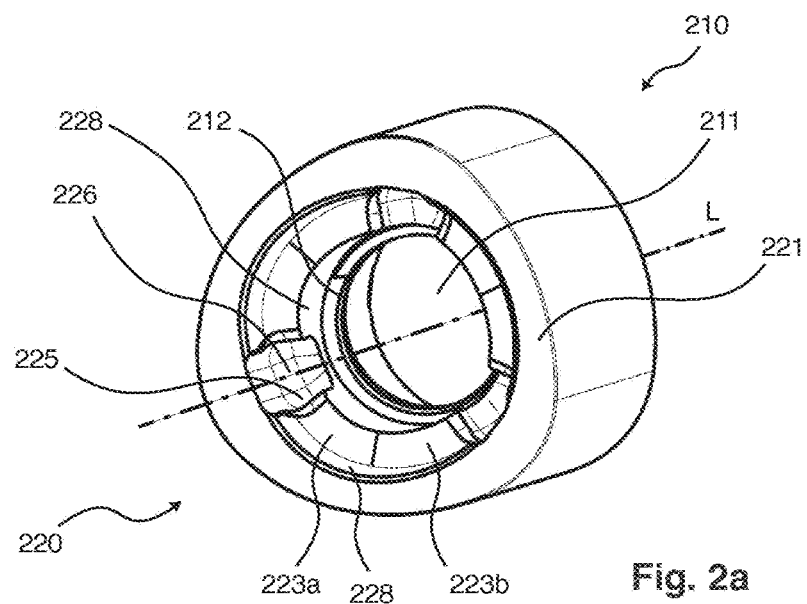
FIG. 2a is an oblique bottom view illustrating an apical interface of a coronal part belonging to a two-piece abutment according to a second embodiment.
Figure 2B:
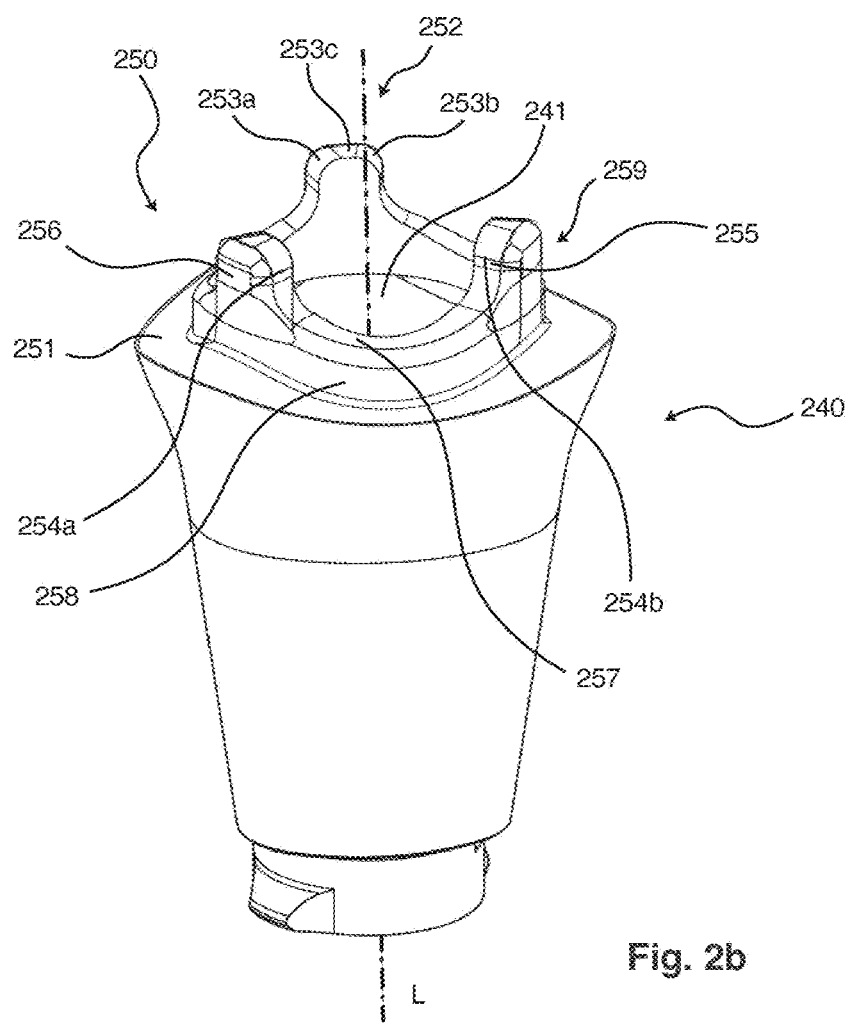
FIG. 2b is an oblique side view of a coronal interface of the apical part of a two-piece abutment according to the second embodiment.

Another embodiment of the present invention is shown in FIGS. 2a and 2b. FIG. 2a illustrates a coronal dental component 210. In difference to the previous embodiment illustrated in FIG. 1, the guiding surface 223 of the coronal dental component 210 does not have a mounting contact surface. Instead, the apical dental component 240 is formed with a mounting contact surface 253c (cf. FIG. 2b).

Further, the fingerlike protrusion 259 defined by the guiding surface 253, the indexing surface 255, and a portion of the accommodation surface 257 (as described above) comprises a snap-fit feature 256. This snap-fit feature 256 of the protrusion 259 is formed as a tapering protrusion that extends radially outwards (cf. FIG. 2a). A corresponding snap-fit feature 226 is formed in each of the indexing sections 224 as a tapered radial recess extending outwards into the surrounding wall of the coronal dental component 210.

When being assembled, the fingerlike protrusions 259 of the apical dental component 240 bend inwards upon contact with the supporting surface 228 of the coronal dental component 210. If the coronal interface 250 of the apical dental component 240 is inserted further into the apical interface 220 of the coronal dental component 210, the protrusions 259 reach the recesses 226 of the indexing sections 224 and snap back, preferably to their initial position.

In this configuration, the dental screw 170 of the previous embodiment may be omitted alongside with the inner thread located in the through hole 241 of the apical dental component 240. In other words, the snap-fit features 256 and 226 can replace the function of the dental screw 170. This results in an easier way of installing the coronal dental component 210 on the apical dental component 240.

Further, as a result of the arrangement of the snap-fit feature, the inner thread 212 of the coronal dental component 210 may assist during assembly by holding an implant screw (not shown) while positioning the coronal dental component 210 and the apical dental component 240 relative to each other. Once the snap-fit features 226 and 256 are in engagement, a dental screw (not shown) can be used to fasten the dental components 210 and 240 to each other (cf. FIG. 1b). Alternatively, an implant screw (not shown) can be inserted and be engaged with a thread of the dental implant to fasten the coronal dental component 210 to the apical dental component 240 and to a dental implant (not shown).

Another difference to the embodiment shown in FIG. 1 is the geometry of the mating surfaces 221 and 251. Both, the mating surface 221 of the coronal dental component 210 and the mating surface 251 of the apical dental component 240 have an undulating configuration. In other words, the mating surfaces 221 and 251 undulate along (or in the direction of) the longitudinal axis L while extending about this axis. In contact, the mating surfaces 221 and 251 may act as a seal as described above. In addition, the undulating surface 251 can be adapted to the surrounding soft tissue of the gingiva in order to disguise the apical dental component 140 of the two-part abutment. Further, the undulation of the surface 251 provides a better visual indication if a final position between the coronal dental component 210 and the apical dental component 240 is reached.

A skilled person will appreciate that any or all of the different configurations in relation to this embodiment, namely of the mounting contact surface, the snap-fit feature, and the geometry of the mating surface may be applied to the first embodiment.

A third embodiment will be explained in the following under reference to FIGS. 3a to 3d. The dental components 310 and 340 have a configuration of the guiding surface 353 that is basically the same as the configuration illustrated and described in relation to FIGS. 2a and 2b. In the third embodiment, the mating surfaces 321 and 351 are formed as ring-shaped surfaces in a plane perpendicular to the longitudinal axis L and extend about said axis.

Figure 3A:
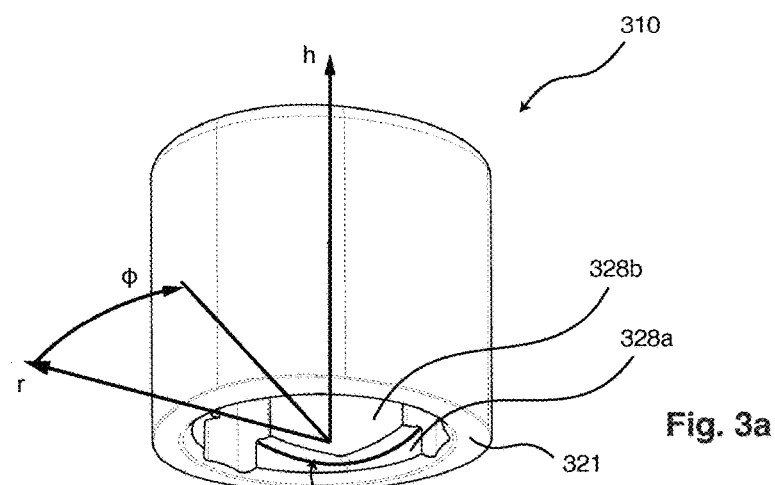
FIG. 3a is an oblique bottom view showing an apical interface of a coronal part belonging to a two-piece abutment according to a third embodiment.
Figure 3B:
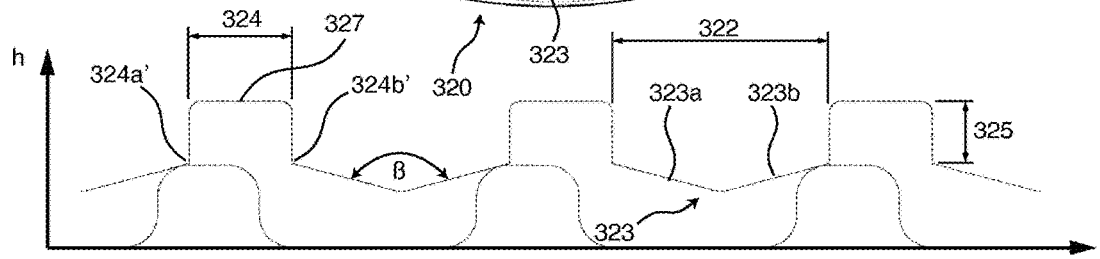
FIG. 3b is a graph showing the profiles of the coronal part shown in FIG. 3a and the apical part shown in FIG. 3d of the two-piece abutment according to the third embodiment at a distance during assembly.
Figure 3C:
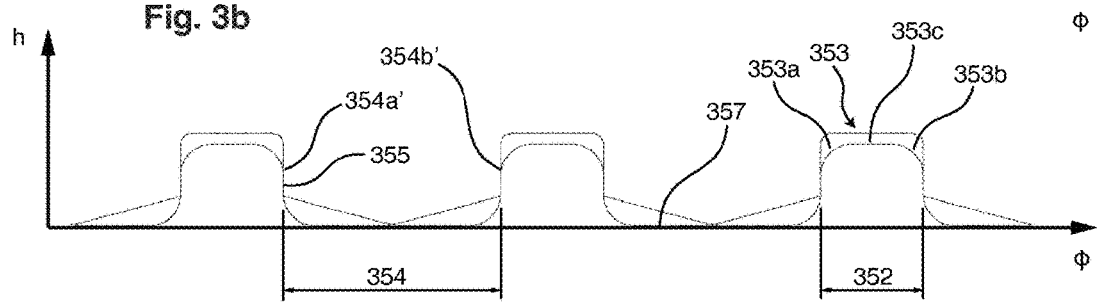
FIG. 3c is a graph showing the profiles of the two-piece abutment illustrated in FIG. 3b in a final position in relation to each other.
Figure 3D:
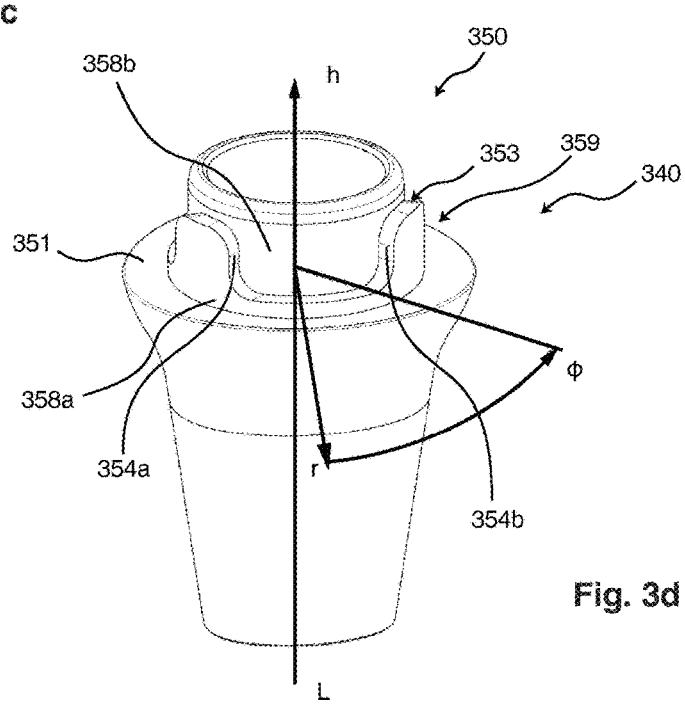
FIG. 3d is an oblique side view showing a coronal interface of the apical part of a two-piece abutment according to the third embodiment.

The coronal dental component 310 and the apical dental component 340 comprise in addition to the support surfaces 328a and 358a that have already been described in relation to the previous embodiments radially facing support surfaces 328b and 358b, respectively. These support surfaces 328b and 358b have a cylindrical shape. As shown in FIGS. 3a and 3d, the radially facing support surfaces 328b and 358b are located radially inwards and adjacent to the guiding sections 322 and 352 as well as indexing sections 324 and 354, respectively.

The radially facing support surface 358b provides structural support for the protrusions 359 of the interface 340. The radially facing support surfaces 328b and 358c also facilitate initial axial alignment during assembly of the dental components 310 and 340. Further, the cylindrical radially facing support surfaces 328b and 358b have an additional sealing effect since they act as an obstacle and render the inside of the dental components 310 and 340 less accessible.

The coronal dental component 310 shown in FIG. 3a and the apical dental component 340 shown in FIG. 3d are illustrated alongside with cylindrical coordinate systems. Based on these cylindrical coordinate systems, FIGS. 3b and 3c show the profiles of the guiding sections 322, 352 and indexing sections 324, 354 of the coronal dental component 310 and apical dental component 340, respectively. In FIG. 3b, the different parts of the guiding sections 322 and the indexing sections 324 of the apical interface 320 are indicated and explained in detail below for a better understanding.

The profile of each indexing section 324 is located between boundary points 324a' and 324b'. Adjacent to each of these boundary points 324a' and 324b' is an indexing surface 325. The indexing surfaces 325 are in turn connected by an accommodation surface 327. As illustrated in FIG. 3b, the accommodation surface 327 preferably has a profile that primarily extends perpendicular to the coordinate axis h or parallel to the coordinate axis φ.

In the illustrated exemplary embodiment, the indexing surfaces 325 are extending parallel to the longitudinal axis L or coordinate axis h. Consequently, the slope of tangents at the boundary points 324a' and 324b' and at the indexing surfaces 325 is infinite, i. e. they represent slopes along a discontinuity of the profile. As already described above, such a slope results in a form fit between the apical interface 320 and the coronal interface 350 in a rotational direction about the longitudinal axis L.

Further, the same slopes are present if the profile is missing the indexing surfaces 325. Here, the boundary points 324a' and 324b' of the profile, i. e. the boundary lines adjacent to the ends of each guiding surface 322, act as a locking feature in a rotational direction about the longitudinal axis L.

Nonetheless, indexing surfaces with a surface profile that are inclined in relation to the axis h are also envisaged. Such indexing surfaces can be embodied as surfaces having a linear and/or curved profiles. In an embodiment, in which the profile of the guiding section 322 and the indexing section 324 is a curve defined by a continuous function such as a sine-function, the boundary points 324a' and 324b' are defined as points on the sine-function having the maximum absolute slope. In such an embodiment, the rotational locking function would be provided at least primarily by the boundary points. Due to the finite slope, the rotational lock would be caused by self-locking friction.

Between the boundary points 324a' and 324b' lies the guiding section 322. Consequently, the boundary points 324a' and 324b' are not part of the guiding section 322. Preferably, the guiding surface 323 of the guiding section 322 comprises two guiding surface portions 323a and 323b having slopes with opposite signs. Even more preferably, the guiding surface portions 323a and 323b are symmetrical in relation to the coordinate axis h of the graphs in FIGS. 3b and 3c. The guiding surface portion 323a and 323b meet each other and form an apex at the apical extremity of the coronal dental component. The apex angle β formed is preferably in a range of 120° to 175° and more preferably in a range of 130° to 150°.

In the embodiment shown, the profiles of the indexing sections 324 and guiding sections 322 or their surfaces form a profile that undulates along (or in the direction of) the longitudinal axis while extending about the longitudinal axis L. Thus, moving along the profile about the longitudinal axis L will also cause an undulating movement along this axis. In other words, the profile may form a signal with at least one predetermined period that consists of an indexing section 324 and a guiding section 322. Thus, the exemplary embodiment shown comprises for both the coronal dental component 310 and the apical dental component 340 three consecutive periods about the longitudinal axis L.

In FIG. 3c, the reference signs refer to parts of the profile that is defined by the guiding sections 352 and indexing sections 354 of the coronal interface 350. Each guiding surface 353 is formed by guiding surface portions 353a and 353b as well as a mounting contact surface 353c in between. The outer ends of the profile of the guiding surface portions 353a and 353b are adjacent to the boundary points 354a' and 354b' that define the endpoints of each indexing section 354. Adjacent to each boundary point 354a' and 354b' of the coronal interface 350 is an indexing surface 355 with a slope of the profile that corresponds to the slope of the indexing surfaces 325 of the apical interface 320. In between the profiles of the two indexing surfaces 325 of each indexing section 354 is the profile of an accommodation surface 357.

In FIG. 3b, the profile of the guiding sections 322 and the indexing sections 324 of the apical interface 320 is shown in a state, in which the apical guiding surface portions 323b of the apical interface 320 are in contact with the guiding surface portions 353a of the coronal interface 350. The contact of these guiding surface portions during assembly results at least in an easier rotation of the profiles, i.e. the surfaces, relative to each other compared to a rotation in the opposite direction. In FIG. 3b, this contact will result in the profile of the apical interface 320 turning left in relation to the profile of the coronal interface 350.

In FIG. 3c, the apical interface 320 and the coronal interface 350 are engaged at a final position. At this final position, the indexing surfaces 325 and 355 face each other to cause above noted form fit so that the interfaces 320 and 350 cannot rotate relative to each other.

Further, FIG. 3c illustrates that at a final position, the mounting contact surface 353c of the guiding sections 352 are at a distance to the accommodation surface 327 of the indexing sections 324. Likewise, the guiding surface 323 of the guiding sections 322 is at a distance to the accommodation surface 357 of the indexing sections 354. As already mentioned above, this results in the mating surfaces 321 and 351 to be in close contact with each other in order to form an effective seal.

As a non-limiting example and in particular this embodiment, the profile(s) of at least one, preferably both, of the guiding sections 322 and indexing sections 354 can have an angular extent (or angular length) preferably between 75 and 85°, more preferably between 77° and 81 and even more preferably of about 79°. The profile(s) of at least one, preferably both, of the indexing sections 324 and/or guiding sections 352 can have an angular extent (or angular length) preferably between 35 and 45°, more preferably between 39 and 43° and even more preferably of about 41°. As already described above, the ratio of the angular extent of the indexing section(s) and the angular extent of guiding section (s) of one dental component may differ. Even more preferably, they differ substantially, i.e. in a range of 1.5 to 8 or ⅛ to ½, alternatively in a range of 3 to 6 or ⅙ to ⅓.

Furthermore, the extent or depth of the indexing section 324 along the longitudinal axis L may be about substantially 1 mm.

In an assembled state, the distance along the longitudinal axis L from the extremity of the guiding section of one of the dental components, i. e. the apex of the guiding surface 323 or the mounting contact surface 353c, to the extremity of the other one of the dental components, i. e. the mounting contact surface 353c or the apex of the guiding surface 323, is preferably larger than the interfering thread length between the dental screw (not shown) and the apical dental component 340 in a correctly assembled state. As a result, the thread of the dental screw cannot be engaged unless the apical dental component 340 and coronal dental component 310 are in a mating relationship.

Figure 4A:
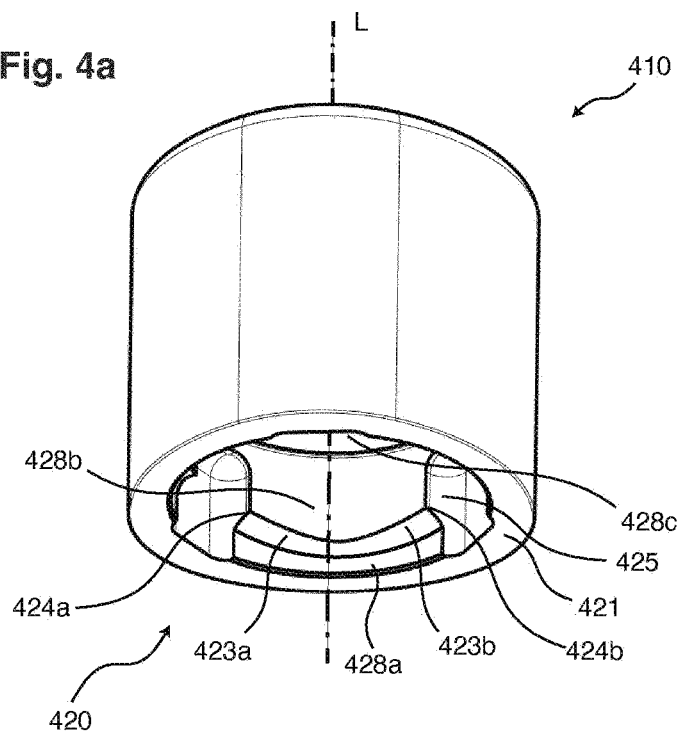
FIG. 4a is an oblique bottom view showing an apical interface of a coronal part belonging to a two-piece abutment according to a fourth embodiment.
Figure 4B:
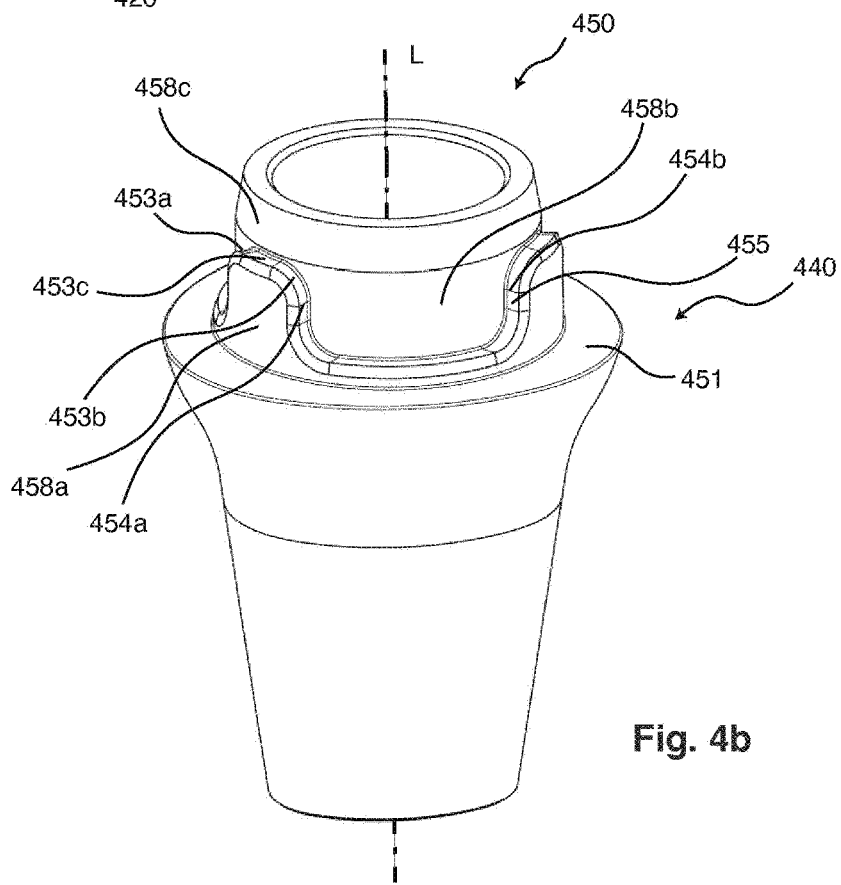
FIG. 4b is an oblique side view showing a coronal interface of the apical part of a two-piece abutment according to the fourth embodiment.

Turning to FIG. 4, FIG. 4a illustrates yet another embodiment of a coronal dental component 410 and a corresponding apical dental component 440. Generally, the dental components shown in FIGS. 4a and 4b correspond to the dental components illustrated in FIGS. 3a and 3d, respectively. However, in contrast to the coronal dental component 340 of FIG. 3d, the coronal dental component 440 of FIG. 4b comprises a frustoconical alignment surface 458c at the coronal end of the support surface 458b instead of the rounded coronal edge at the coronal end of the cylindrical support surface 358b.

The frustoconical alignment surface 458c faces radially outwards. It helps achieving initial axial alignment between the two dental components during assembly upon contact of the frustoconical alignment surface 458c of the apical dental component 440 with the corresponding radially inwards facing frustoconical alignment surface 428c of the coronal dental component 410. In accordance with the structure of the apical dental component 440, the radially inwards facing frustoconical alignment surface 428c is adjacent to the coronal end of the radially inwards facing support surface 428b.

Figures 5A, 5B:
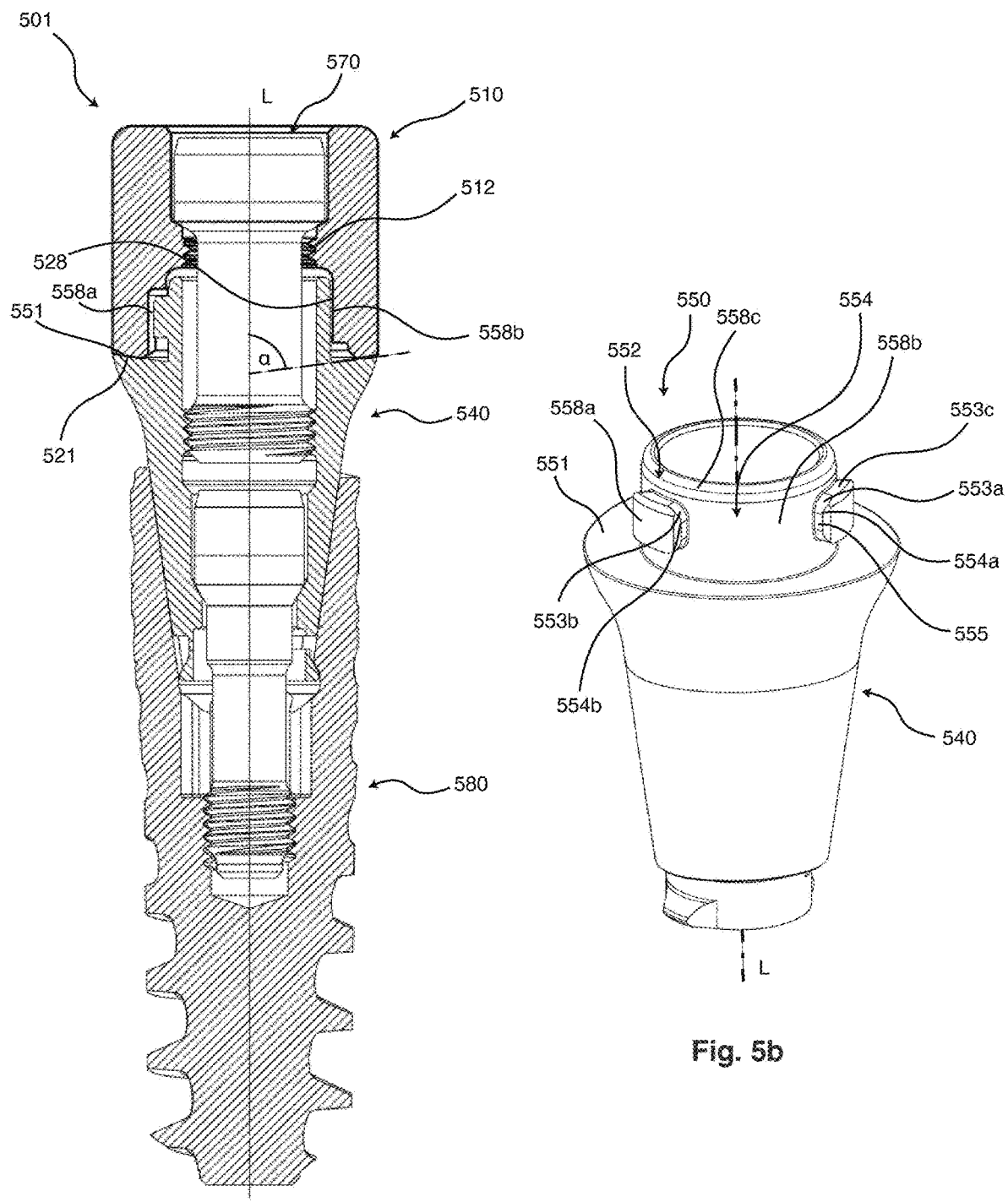
FIG. 5a is a cross-sectional view along the longitudinal axis of a dental assembly according to a fifth embodiment.
FIG. 5b is an oblique side view illustrating a coronal interface of the apical part of a two-piece abutment according to the fifth embodiment.

FIG. 5a and FIG. 5b show yet another embodiment of a dental assembly 501 and an apical dental component 540, respectively. In this embodiment, the mating surfaces 521 and 551 are positioned like the mating surfaces of previous embodiments at the outer periphery of the coronal dental component 510 and the apical dental component 540. However, the mating surface 521 of the coronal component 510 and the mating surface 551 of the apical dental component 540 are inclined in relation to the longitudinal axis L by an angle α. Due to this angle α, the mating surfaces 521 and 551 do not extend in a plane perpendicular to the longitudinal axis L. In other words, the angle α differs from 90°. Instead, this angle preferably has one of the values in the ranges as defined above. These angled or frustoconical mating surfaces 521 and 551 can be applied to any of the previous embodiments as well as to the following embodiment.

Further, the angle $\alpha_a$ of the mating surface 551 of the apical component 540 may differ from the angle $\alpha_c$ of the mating surface 521 of the coronal component 510 so that a contact between these surfaces is generally a line contact about the longitudinal axis L. Still, both angles $\alpha_a$, $\alpha_c$ have a value of above-defined ranges. The difference between these angles $\alpha_a$ and $\alpha_c$ is preferably in a range of 1° to 5°, more preferably in a range of 1° to 3°, and in particular 2°. Preferably, in relation to the longitudinal axis L, the angle $\alpha_a$ is greater than the angle $\alpha_c$. Moreover, the difference between these angles $\alpha_a$ and $\alpha_c$ preferably results in the line contact being established on the radially inner side of the mating surfaces 521 and 551 in relation to the longitudinal axis L or closer to the longitudinal axis than to the periphery or outer wall of the dental components 510 and 540. This results in a better stress distribution for forces in the direction of the longitudinal axis of the coronal dental component 510 and the apical dental component 540. Further, it can form a seal in an assembled state of these components.

Another difference to the previous embodiments is that the indexing sections 554 do not comprise an accommodation surface. Instead, the indexing sections 554 have the boundary lines 554a and 554b and adjacent to each of these an indexing surface 555. Instead of the accommodation surface, the mating surface 551 extends radially further inwards than in the previous embodiments so that the guiding surface of the corresponding apical dental component 510 faces the mating surface 551 when being at a final position. As a result, only a portion of the mating surface 551 is located next, i. e. outwards, to the guiding sections 552 and indexing sections 554 as viewed along the longitudinal axis L, wherein the remaining portion of the mating surface 551 in the radial direction is located beneath the guiding sections 552 and indexing sections 554.

As illustrated in FIG. 5b, the guiding surface 553 with the guiding surface portions 553a and 553b as well as the mounting contact surface 553c and the adjacent indexing surfaces 555 substantially define the geometry of a protrusion extending outwards from the cylindrical support surface 558b. The outer face of this protrusion forms the support surface 558a. Consequently and in contrast to the previous embodiments, the radially outwards facing support surface 558a does not extend until the mating surface 551. Instead, a gap is present between the protrusion defined by of the above mentioned surfaces and the mating surface 551.

As previously mentioned, it is also envisaged that the indexing section may solely have the boundary lines 554a and 554b as structural features. In this case neither an indexing surface nor an accommodation surface would be present. As defined above, the slope at the boundary lines would then be defined as being infinite and, thus, sufficient to provide a rotational locking function based on a form fit.

Further, the coronal components 310 illustrated in FIGS. 3a to 3c corresponds to the apical component in FIG. 5. The same applies to the indexing and guiding sections of the coronal dental component 410 shown in FIG. 4a.

Figures 6A, 6B:
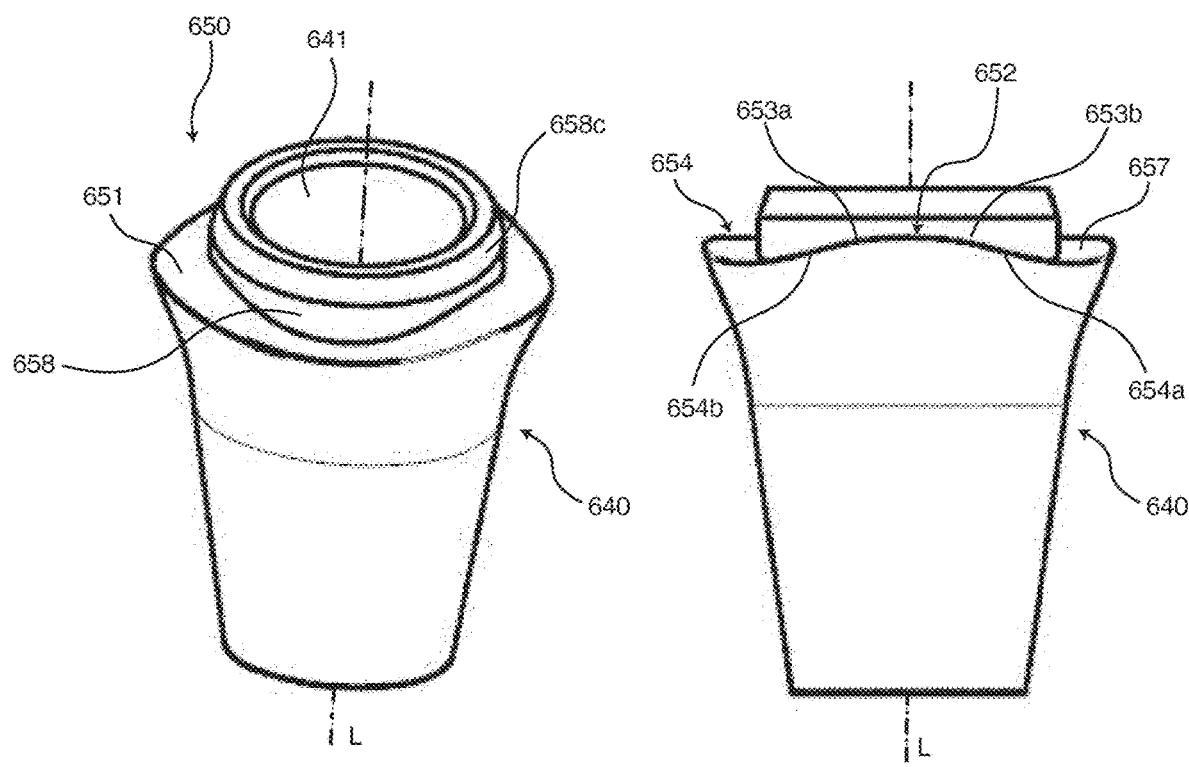

Another embodiment of a dental component 640 is illustrated in FIGS. 6a and 6b that is also based on the principles of the present invention. Although these figures show an apical dental component 640 with a coronal interface 650, the skilled person will at least from the previous description be aware how to shape a corresponding interface for a coronal dental component that is intended to reach a final position in relation to the apical dental component 640, in which the two components are radially and rotationally aligned.

The coronal interface 650 of the apical dental component 640 comprises at its peripheral edge a mating surface 651. Adjacent to the edge of the mating surface 651 radially located inwards is a cylindrical outwardly facing support surface 658. At the coronal end of the outwardly facing support surface 658 is a frustoconical sealing surface 658c. This sealing surface 658c and the support surface 658 have the same structure, function and advantages as described in relation to the embodiment shown in FIG. 4.

In contrast to the previous embodiments, the mating surface 651 is an undulating ring-shaped surface that also has the functionality of the previously described guiding sections and indexing sections. More specifically, the guiding sections 652 and indexing sections 654 are embodied by the undulations of the mating surface 651. Like in the previous embodiments, the surface of the guiding sections 652 are located closer to the coronal extremity of the apical dental component 640 than the surface of the indexing sections 654.

The extension of the indexing sections about the longitudinal axis L is also defined by two boundary lines 654a and 654b traversing the width of the mating surface. Since the undulating mating surface 651 is defined by a continuous function, such as a sine function, the boundary lines 654a and 654b are located at the tangents to the mating surface 651 with the maximum absolute slope. Self-locking can be achieved by the surface properties of the mating surface 651 and the amplitude described by this function, which relates to the maximum slope at the boundary lines 654a and the 654b. In other words, if the amplitude is large enough, the slope at the boundary lines 654a and 654b will be sufficient for a self-locking effect of the dental component 640 in relation to another dental component.

In comparison to the previous embodiments, the structure of the dental component shown in FIG. 6a and FIG. 6b is simplified. Due to the missing discontinuity in the surface's profile, there may be less haptic feedback for a dental professional that indicates that the final position of the dental components is reached. However, by setting the amplitude and the surface roughness of the profile so that the dental components will slide against each other to the final position due to the weight of the upper component (in relation to gravitation), the dental assembly can find the mating relationship by itself.

In the different embodiments described above, the configurations of the different parts of the apical and coronal interfaces may be switched between dental components. In other words, the arrangement and/or configuration of the mating surfaces, guiding sections, indexing sections and/or radially facing support surfaces can be formed vice versa on the dental components. For example, the shape of the guiding sections and indexing sections of the coronal interfaces of the apical dental components shown above can be formed at the apical interfaces of the coronal dental components and vice versa.

REFERENCE NUMBERS

The following reference numbers are general reference numbers of features used in the afore-described embodiments. In the detailed description as well as in the drawings, they are supplemented by the figure number as their first digit. For reasons of legibility, the attached claims also only contain the general reference numbers.

1 dental assembly
10 coronal dental component
11 through hole
12 internal thread
13 screw seat
20 apical interface of coronal dental component
21 apically facing mating surface
22 guiding section
23 apically facing guiding surface
23a, 23b guiding surface portion
23c mounting contact surface
24 indexing section
24a, 24b boundary lines
24a', 24b' boundary points
25 indexing surface
26 snap fit feature
27 apically facing accommodation surface
28, 28a, 28b radially facing support surface
28c frustoconical alignment surface
40 apical dental component
41 through hole
42 internal thread
50 coronal interface of apical dental component
51 coronally facing mating surface
52 guiding section
53 coronally facing guiding surface
53a, 53b guiding surface portion
53c mounting contact surface
54 indexing section
54a, 54b boundary lines
54a', 54b' boundary points
55 indexing surface
56 snap fit feature
57 coronally facing accommodation surface
58, 58a radially support surface in assembled state
58b radially facing support and alignment surface
58c frustoconical alignment surface
59 protrusion of coronally facing interface
70 dental screw
71 engagement section
80 dental implant
81 implant screw
90 apical interface L longitudinal axis
r polar coordinate
h longitudinal coordinate
α mating surface angle
$α_a$ mating surface angle of apical dental component
$α_c$ mating surface angle of coronal dental component
β apex angle
φ angular coordinate

The invention claimed is:

1. A dental component including:
a coronal end, an apical end, and
an interface configured to assemble to an other dental component, the interface comprising:
  a plurality of protrusions, each protrusion of the plurality of protrusions comprising:
    at least two indexing sections configured to rotationally lock the dental component to the other dental component, and
    at least one guiding section configured to guide the other dental component about a longitudinal axis towards the next indexing section, the longitudinal axis extending between the coronal end and the apical end,
  wherein the at least one guiding section and the at least two indexing sections alternate about the longitudinal axis, the at least one guiding section and the at least two indexing sections forming an undulating surface about the longitudinal axis of the dental component, the undulating surface undulating along a longitudinal direction,
  wherein each of the at least one guiding section includes an apically facing or a coronally facing guiding surface,
  wherein each of the at least two indexing sections comprises a surface parallel to the longitudinal axis,
  a mating surface extending between the plurality of protrusions,
  wherein the mating surface is configured to transfer forces in a direction of the longitudinal axis of the dental component, the mating surface facing in a same direction as the guiding surface and extending about the longitudinal axis, and
  at least one radially facing support surface, the at least one radially facing support surface being located radially inwards in relation to the at least two indexing sections and the at least one guiding section, the at least one radially facing support surface forming an extremity of the interface, the at least one radially facing support surface comprising at least a portion of a cylindrical surface extending between the plurality of protrusions,
  wherein the at least one guiding section has two guiding surface portions and a mounting contact surface situated between the two guiding surface portions, wherein the mounting contact surface is parallel to a plane perpendicular to the longitudinal axis.

2. The dental component according to claim 1, wherein a tangent to at least a portion of the guiding surface has a slope towards the next indexing section about the longitudinal axis.

3. The dental component according to claim 1, wherein at least a portion of the mating surface is arranged radially next to the at least one guiding section and the at least two indexing sections.

4. The dental component according to claim 3, wherein the mating surface is frustoconical or undulates as a continuous periodic function along its entire extension about the longitudinal axis.

5. The dental component according to claim 1, wherein each indexing section of the at least two indexing sections is defined between two boundary lines, wherein the two boundary lines define two boundary points along a profile of the indexing section and a tangent to any one of the two boundary points has a larger absolute slope than any tangent to a profile of the at least one guiding section.

6. The dental component according to claim 5, wherein the tangent to each of the two boundary points has an absolute angle to the longitudinal axis in a range of 0° to 10°.

7. The dental component according to claim 5, wherein each of the two boundary lines is part of an indexing surface.

8. The dental component according to claim 1, wherein the two guiding surface portions each have at least one tangent, wherein the tangents of the two guiding surface portions at the same location along the longitudinal axis have the same absolute slope but different signs.

9. The dental component according to claim 1, the dental component being a dental implant, an abutment or a coronal or apical part of a multi-piece abutment.

10. A dental assembly for mounting a prosthesis, the dental assembly comprising:
    the dental component according to claim 1 with at least a part of the interface facing apically as a coronal dental component for the other dental component; and
    the dental component according to claim 1 with at least a part of the interface facing coronally as an apical dental component for the other dental component.

11. The dental assembly according to claim 10, further comprising a dental screw configured to fixate the dental assembly, the dental screw having a predetermined length, wherein the apical dental component comprises an internal thread, the internal thread being arranged along a portion of the longitudinal axis of the apical dental component so that it can only be engaged by the dental screw if the apically facing interface of the coronal dental component and the coronally facing interface of the apical dental component are arranged at a final position.

12. The dental assembly according to claim 11, wherein at the final position, the at least one guiding section of one of the coronal dental component or the apical dental component is at a distance to one of the at least two indexing sections of the other one of the coronal dental component or the apical dental component.

13. The dental component according to claim 1, wherein the mating surface extends between one indexing section of one protrusion of the plurality of protrusions and another indexing section of another protrusion of the plurality of protrusions.

14. A dental component including:
    a coronal end, an apical end, and
    an interface configured to assemble to an other dental component, the interface comprising:
        a plurality of protrusions, each protrusion of the plurality of protrusions comprising:
            at least two indexing sections configured to rotationally lock the dental component to the other dental component, and
            at least one guiding section configured to guide the other dental component about a longitudinal axis towards the next indexing section, the longitudinal axis extending between the coronal end and the apical end,
        wherein the at least one guiding section and the at least two indexing sections alternate about the longitudinal axis, the at least one guiding section and the at least two indexing sections forming an undulating surface about the longitudinal axis of the dental component, the undulating surface undulating along a longitudinal direction,
        wherein each of the at least one guiding section includes an apically facing or a coronally facing guiding surface,
        wherein each of the at least two indexing sections comprises a surface parallel to the longitudinal axis,
        wherein each indexing section of the at least two indexing sections is defined between two boundary lines, wherein the two boundary lines define two boundary points along a profile of the indexing section and a tangent to any one of the two boundary points has a larger absolute slope than any tangent to a profile of the at least one guiding section,
        a mating surface extending between the plurality of protrusions,
        wherein the mating surface is configured to transfer forces in a direction of the longitudinal axis of the dental component, the mating surface facing in a same direction as the guiding surface and extending about the longitudinal axis, and
        at least one radially facing support surface, the at least one radially facing support surface being located radially inwards in relation to the at least two indexing sections and the at least one guiding section, the at least one radially facing support surface forming an extremity of the interface, the at least one radially facing support surface comprising at least a portion of a cylindrical surface extending between the plurality of protrusions.

15. The dental component according to claim 14, wherein the mating surface is frustoconical.

16. The dental component according to claim 14, wherein the mating surface undulates as a continuous periodic function along its entire extension about the longitudinal axis.

17. A dental assembly for mounting a prosthesis, the dental assembly comprising:
    a coronal dental component; and
    an apical dental component,
    wherein each of the coronal dental component and the apical dental component comprises:
    a coronal end, an apical end, and
    an interface configured to assemble to the other dental component, the interface comprising:
        a plurality of protrusions, each protrusion of the plurality of protrusions comprising:
            at least two indexing sections configured to rotationally lock the dental component to the other dental component, and
            at least one guiding section configured to guide the other dental component about a longitudinal axis towards the next indexing section, the longitudinal axis extending between the coronal end and the apical end,
        wherein the at least one guiding section and the at least two indexing sections alternate about the longitudinal axis, the at least one guiding section and the at least two indexing sections forming an undulating surface about the longitudinal axis of the dental component, the undulating surface undulating along a longitudinal direction, wherein each of the at least one guiding section includes an apically facing or a coronally facing guiding surface, wherein each of the at least two indexing sections comprises a surface parallel to the longitudinal axis, a mating surface extending between the plurality of protrusions, wherein the mating surface is configured to transfer forces in a direction of the longitudinal axis of the dental component, the mating surface facing in a same direction as the guiding surface and extending about the longitudinal axis, and at least one radially facing support surface, the at least one radially facing support surface being located radially inwards in relation to the at least two indexing sections and the at least one guiding section, the at least one radially facing support surface forming an extremity of the interface, the at least one radially facing support surface comprising at least a portion of a cylindrical surface extending between the plurality of protrusions, wherein at least a part of the interface of the coronal dental component faces apically, and wherein at least a part of the interface of the apical dental component faces coronally.

18. The dental assembly according to claim 17, wherein the coronal and apical dental components are an abutment and a dental implant respectively, or wherein the coronal and apical dental components are a coronal and apical part of a multi-piece abutment respectively.

19. The dental assembly according to claim 17, further comprising a dental screw configured to fixate the dental assembly, the dental screw having a predetermined length, wherein the apical dental component comprises an internal thread, the internal thread being arranged along a portion of the longitudinal axis of the apical dental component so that it can only be engaged by the dental screw if the apically facing interface of the coronal dental component and the coronally facing interface of the apical dental component are arranged at a final position.

20. The dental assembly according to claim 19, wherein at the final position, the at least one guiding section of one of the coronal dental component or the apical dental component is at a distance to one of the at least two indexing sections of the other one of the coronal dental component or the apical dental component.

* * * * *